(12) United States Patent
Rossbach et al.

(10) Patent No.: US 12,063,121 B2
(45) Date of Patent: Aug. 13, 2024

(54) UPLINK AND DOWNLINK CONFIGURATION ENHANCEMENT

(71) Applicant: APPLE INC., Cupertino, CA (US)

(72) Inventors: Ralf Rossbach, Neubiberg (DE); Fangli Xu, Beijing (CN); Murtaza A. Shikari, Cupertino, CA (US); Dawei Zhang, Cupertino, CA (US); Haijing Hu, Cupertino, CA (US); Sarma V. Vangala, Cupertino, CA (US); Srinivasan Nimmala, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 524 days.

(21) Appl. No.: 17/593,172

(22) PCT Filed: Jan. 14, 2021

(86) PCT No.: PCT/CN2021/071865
§ 371 (c)(1),
(2) Date: Sep. 10, 2021

(87) PCT Pub. No.: WO2022/151215
PCT Pub. Date: Jul. 21, 2022

(65) Prior Publication Data
US 2023/0188272 A1    Jun. 15, 2023

(51) Int. Cl.
*H04L 1/1867* (2023.01)
*H04L 1/1812* (2023.01)
(Continued)

(52) U.S. Cl.
CPC ............ *H04L 1/189* (2013.01); *H04L 1/1812* (2013.01); *H04W 72/1268* (2013.01); *H04W 72/23* (2023.01)

(58) Field of Classification Search
CPC .. H04L 1/189; H04L 1/1812; H04W 72/1268; H04W 72/23
See application file for complete search history.

(56) References Cited

U.S. PATENT DOCUMENTS

2020/0266928 A1*  8/2020  Yeo .................. H04L 1/0003
2021/0400714 A1* 12/2021  Huang ............... H04L 1/1896

FOREIGN PATENT DOCUMENTS

| CN | 111656840 A | 9/2020 |
|---|---|---|
| WO | 2020063640 A1 | 4/2020 |

OTHER PUBLICATIONS

Huawei, Hisilicon , "Determination of HARQ process ID for a CG/SPS occasion", R2-1910822 (Revision of R2-1907258) 3GPP TSG-RAN WG2 Meeting 106, Prague, Czech Republic, Agenda Item 11.7.2.2, Aug. 26-30, 2019, 3 pages.

(Continued)

*Primary Examiner* — Kyaw Z Soe
(74) *Attorney, Agent, or Firm* — Dorsey & Whitney

(57) ABSTRACT

Provided is a method by a user equipment (UE), comprising: acquiring, from a Base Station (BS), one or more messages comprising a first group of parameters and a second group of parameters of one or more Configured Grant (CG) configuration in a bandwidth part (BWP) of a cell, at least one CG configuration with the second group of parameters indicates a plurality of transmission occasions within a period, and repeating transmission of a Transport Block (TB) in the plurality of transmission occasions based on the at least one CG configuration.

20 Claims, 15 Drawing Sheets

(51) Int. Cl.
 H04W 72/1268 (2023.01)
 H04W 72/23 (2023.01)

(56) References Cited

OTHER PUBLICATIONS

PCT/CN2021/071865, International Search Report and Written Opinion, Sep. 28, 2021, 9 pages.

* cited by examiner

300

```
┌─────────────────────────────────────────────────────────┐
│ ACQUIRING, FROM A BASE STATION (BS), ONE OR MORE        │
│ MESSAGES COMPRISING A FIRST GROUP OF PARAMETERS AND A   │
│ SECOND GROUP OF PARAMETERS OF ONE OR MORE CONFIGURED    │ ~ 310
│ GRANT (CG) CONFIGURATIONS IN A BANDWIDTH PART (BWP) OF  │
│ A CELL, WHEREIN AT LEAST ONE CG CONFIGURATION WITH THE  │
│ SECOND GROUP OF PARAMETERS INDICATES A PLURALITY OF     │
│ TRANSMISSION OCCASIONS WITHIN A PERIOD                  │
└─────────────────────────────────────────────────────────┘
                              │
                              ▼
┌─────────────────────────────────────────────────────────┐
│ REPEATING TRANSMISSION OF A TRANSPORT BLOCK (TB) IN THE │
│ PLURALITY OF TRANSMISSION OCCASIONS BASED ON THE AT     │ ~ 320
│ LEAST ONE CG CONFIGURATION                              │
└─────────────────────────────────────────────────────────┘
```

┌─────────────────────────────────────────────────────┐
│ ACQUIRING, FROM A BASE STATION (BS), ONE OR MORE MESSAGES │
│ COMPRISING A FIRST GROUP OF PARAMETERS AND A SECOND │  710
│ GROUP OF PARAMETERS OF ONE OR MORE SEMI-PERSISTENT │
│ SCHEDULING (SPS) CONFIGURATIONS IN A BANDWIDTH PART (BWP) │
│ OF A CELL, WHEREIN AT LEAST ONE SPS CONFIGURATION WITH THE │
│ SECOND GROUP OF PARAMETERS INDICATES A PLURALITY OF │
│ TRANSMISSION OCCASIONS WITHIN A PERIOD │
└─────────────────────────────────────────────────────┘
                              │
                              ▼
┌─────────────────────────────────────────────────────┐
│ REPEATING TRANSMISSION OF A TRANSPORT BLOCK (TB) IN THE │  720
│ PLURALITY OF TRANSMISSION OCCASIONS BASED ON THE AT │
│ LEAST ONE SPS CONFIGURATION │
└─────────────────────────────────────────────────────┘

```
┌─────────────────────────────────────────────────────────────┐
│ GENERATING ONE OR MORE MESSAGES FOR TRANSMITTING TO USER    │
│ EQUIPMENT (UE), WHEREIN THE ONE OR MORE MESSAGES COMPRISES A│  ↘ 810
│ FIRST GROUP OF PARAMETERS AND A SECOND GROUP OF PARAMETERS  │
│ OF ONE OR MORE CONFIGURED GRANT (CG) CONFIGURATION IN A     │
│ BANDWIDTH PART (BWP) OF A CELL, WHEREIN AT LEAST ONE CG     │
│ CONFIGURATION WITH THE SECOND GROUP OF PARAMETERS INDICATES │
│ A PLURALITY OF TRANSMISSION OCCASIONS WITHIN A PERIOD       │
└─────────────────────────────────────────────────────────────┘
                              │
                              ▼
┌─────────────────────────────────────────────────────────────┐
│ RECEIVING A REPEATED TRANSMISSION OF A TRANSPORT BLOCK (TB) IN│ ↘ 820
│        THE PLURALITY OF TRANSMISSION OCCASIONS               │
└─────────────────────────────────────────────────────────────┘
```

910 — GENERATING ONE OR MORE MESSAGES FOR TRANSMITTING TO USER EQUIPMENT (UE), WHEREIN THE ONE OR MORE MESSAGES COMPRISES A FIRST GROUP OF PARAMETERS AND A SECOND GROUP OF PARAMETERS OF ONE OR MORE SEMI-PERSISTENT SCHEDULING (SPS) CONFIGURATION IN A BANDWIDTH PART (BWP) OF A CELL, WHEREIN AT LEAST ONE SPS CONFIGURATION WITH THE SECOND GROUP OF PARAMETERS INDICATES A PLURALITY OF TRANSMISSION OCCASIONS WITHIN A PERIOD

920 — RECEIVING A REPEATED TRANSMISSION OF A TRANSPORT BLOCK (TB) IN THE PLURALITY OF TRANSMISSION OCCASIONS

FIG. 9

UPLINK AND DOWNLINK CONFIGURATION ENHANCEMENT

TECHNICAL FIELD

This application relates generally to wireless communication systems, and more specifically to Uplink (UP) and Downlink (DL) configuration.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, ox eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method by a user equipment (UE), is provided that comprises acquiring, from a Base Station (BS), one or more messages comprising a first group of parameters and a second group of parameters of one or more Configured Grant (CG) configurations in a bandwidth part (BWP) of a cell, wherein at least one CG configuration with the second group of parameters indicates a plurality of transmission occasions within a period; and repeating transmission of a Transport Block (TB) in the plurality of transmission occasions based on the at least one CG configuration.

According to an aspect of the present disclosure, a method by a user equipment (UE), is provided that comprises acquiring, from a Base Station (BS), one or more messages comprising a first group of parameters and a second group of parameters of one or more Semi-Persistent Scheduling (SPS) configurations in a bandwidth part (BWP) of a cell, wherein at least one SPS configuration with the second group of parameters indicates a plurality of transmission occasions within a period; and repeating transmission of a Transport Block (TB) in the plurality of transmission occasions based on the at least one SPS configuration.

According to an aspect of the present disclosure, a method by a Base Station (BS), is provided that comprises generating one or more messages for transmitting to user equipment (UE), wherein the one or more messages comprises a first group of parameters and a second group of parameters of one or more Configured Grant (CG) configuration in a bandwidth part (BWP) of a cell, wherein at least one CG configuration with the second group of parameters indicates a plurality of transmission occasions within a period, and receiving a repeated transmission of a Transport Block (TB) in the plurality of transmission occasions.

According to an aspect of the present disclosure, a method by a Base Station (BS), is provided that comprises generating one or more messages for transmitting to user equipment (UE), wherein the one or more messages comprises a first group of parameters and a second group of parameters of one or more Semi-Persistent Scheduling (SPS) configuration in a bandwidth part (BWP) of a cell, wherein at least one SPS configuration with the second group of parameters indicates a plurality of transmission occasions within a period, and receiving a repeated transmission of a Transport Block (TB) in the plurality of transmission occasions.

According to an aspect of the present disclosure, an apparatus for a user equipment (UE), the apparatus comprises one or more processors configured to perform steps of the method according to any of methods by the UE provided herein.

According to an aspect of the present disclosure, an apparatus for a base station, the apparatus comprises one or more processors configured to perform steps of the method according to any of methods by the BS provided herein.

According to an aspect of the present disclosure, a computer readable medium having computer programs stored thereon which, when executed by one or more processors, cause an apparatus to perform steps of the method according to any of methods provided herein.

According to an aspect of the present disclosure, an apparatus for a communication device, comprising means for performing steps of the method according to any of methods provided herein.

According to an aspect of the present disclosure, a computer program product comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3 illustrates a flowchart for an exemplary method by a UE.

FIG. 7 illustrates a flowchart for an exemplary method by a UE.

FIG. 8 illustrates a flowchart for an exemplary method by a BS.

FIG. 9 illustrates a flowchart for an exemplary method by a BS.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Figure 1:
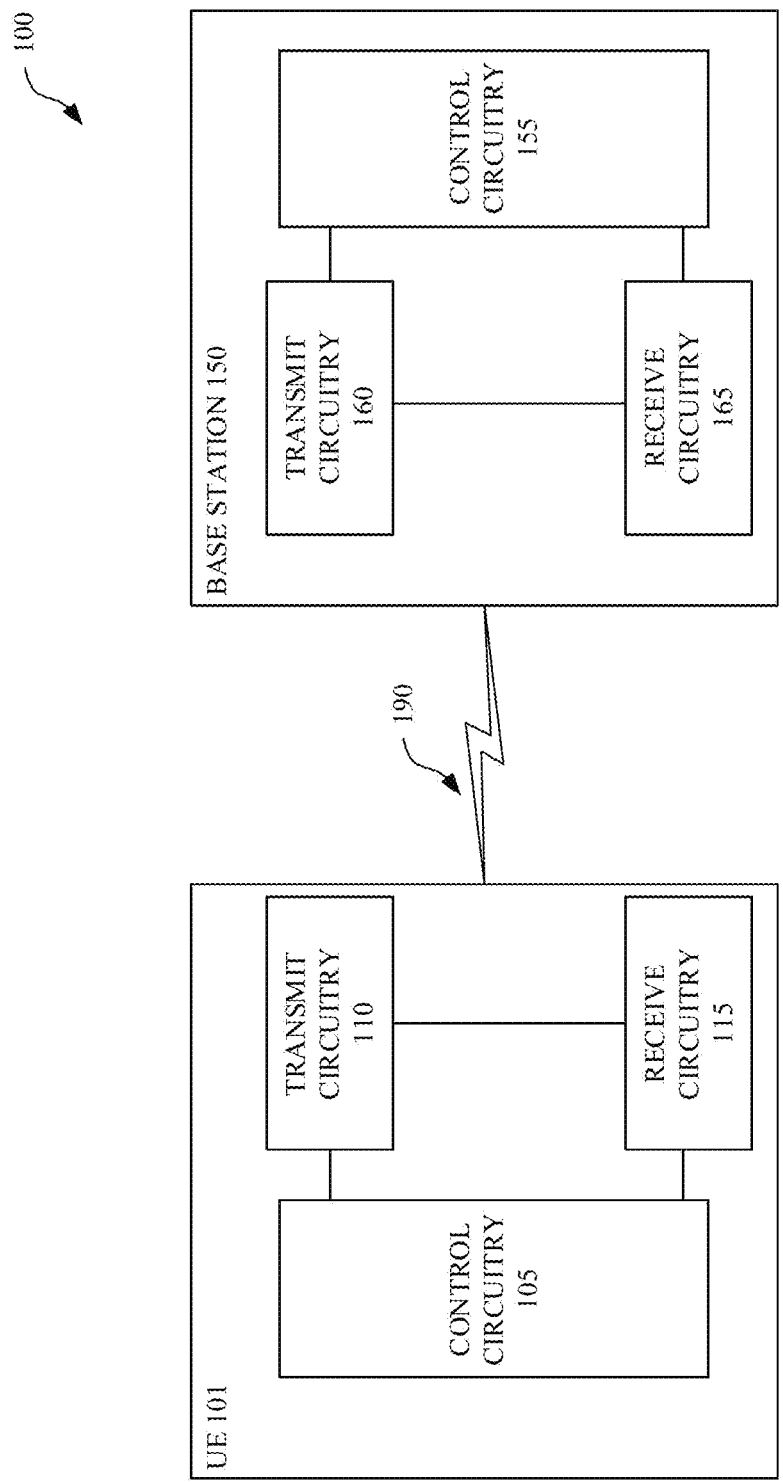
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided Into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115 The transmit circuitry 110 and receive circuitry 135 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM of FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The Industrial Internet of Things (Ho T) and Ultra-Reliable Low-Latency Communication (URLLC) for deterministic communication or the like typically rely on configured grants (CO) in uplink and semi-persistent scheduling (SPS) in downlink.

Since the latency is very short for many IIoT or URLLC applications, traditional Radio Link Control (RLC) Acknowledged Mode (AM) may not be enabled RLC AM may be too slow for recovery, especially for URLLC applications with very low latency. Therefore, there is a need for better recovery on Medium Access Control (MAC) layer or Physical (PHY) layer, through Hybrid Automatic Repeat Request (HARQ) for example. As such, a higher degree of reliability may be required for a period of time.

Figure 2:
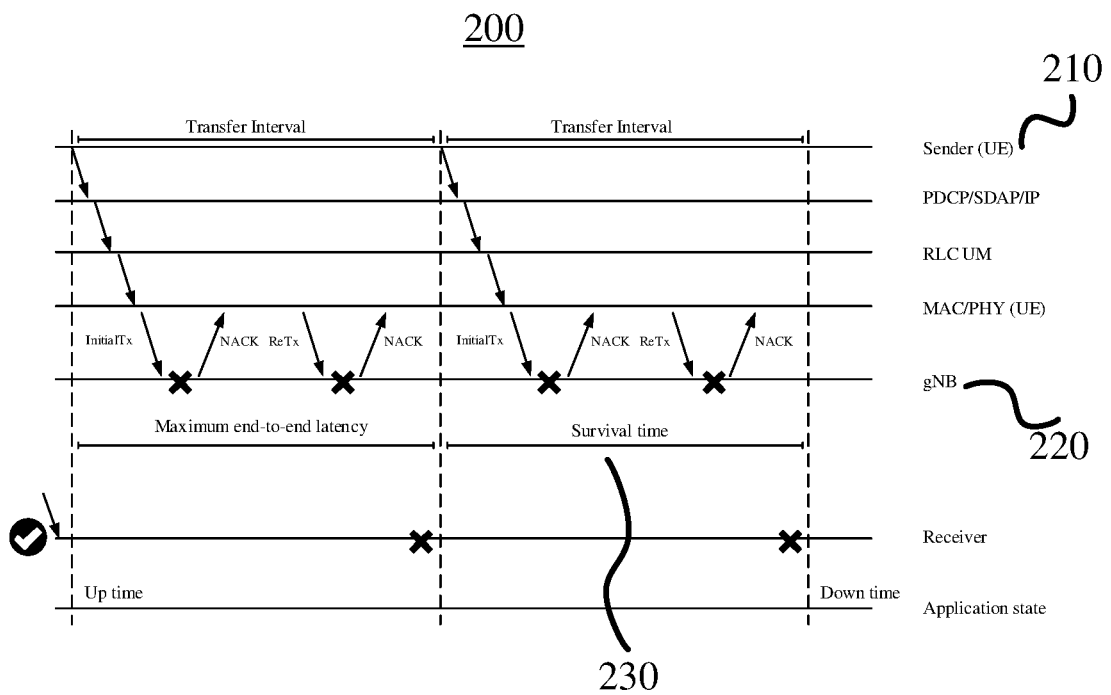
FIG. 2 illustrates an uplink (UL) transmit scenario with traditional configuration.

FIG. 2 illustrates an uplink (UL) transmit scenario with traditional configuration. As shown in FIG. 2, the traditional uplink transmission scenario 200 includes a sender 210, that could be UE, sending message to the BS 220, which is called gNodeB (gNB) in 5G communication. When the initial transmission (InitialTx) fails to delivery the message to BS 220, a non-acknowledged of negative acknowledged (NACK) will send. If the failure continues, the communication service will be lost after the end of survival time 230.

The survival time 230 may be the definition from TS 22.104, that is, is the time that an application consuming a communication service may continue without an anticipated message. It also may be the definition from TR 22.832, that is, it indicates to the communication service the time available to recover from message delivery failures. The survival time 230 is expressed as a time period which, especially with cyclic traffic, accommodates the maximum number of consecutive incorrectly received or lost messages that can be tolerated with causing an application layer failure.

For applications that have survival time 230 equal to zero, any loss of packet triggers this unavailability, while for applications with non-zero survival time only two or more consecutive packet losses will trigger unavailability depending on the agreed traffic periodicity and length of the survival time 230.

The aim is to avoid losing the communication service by adding extra protection for ongoing messages that are in-flight or new messages. For example, this may be achieved during the survival time 230.

FIG. 3 illustrates a flowchart for an exemplary method by a UE. As shown in FIG. 3, a method 300 by a UE includes step 310 and step 320.

In step 310, the UE may acquire one or more messages from the BS. The messages may include a first group of parameters and a second group of parameters of one or more Configured Grant (CO) configuration in a bandwidth (BWP) of a cell. At least one CG configuration with the second group of parameters indicates a plurality of transmission occasions within a period.

In step 320, the UE repeats the transmission of a Transport Block (TB) in the plurality of transmission occasions based on the at least one CG configuration.

In some embodiments, the first group of parameters may be the same parameters included in the ConfiguredGrant-Config.

In some embodiments, the second group of parameters may include some extra parameters that at least one of the extra parameters is different from the ConfiguredGrantConfig m the first group of parameters In addition, the second group of parameters may contain just the delta to configuredGrantConfig in the first group of parameters, i.e. only contain parameters that are different from the configuredGrantConfig in first group of parameters. Alternatively, the second parameters may be a full new CG configuration.

In some embodiments, the transmission of the TB may be an initial transmission (InitialTx) or a retransmission (ReTx).

Figure 4A:
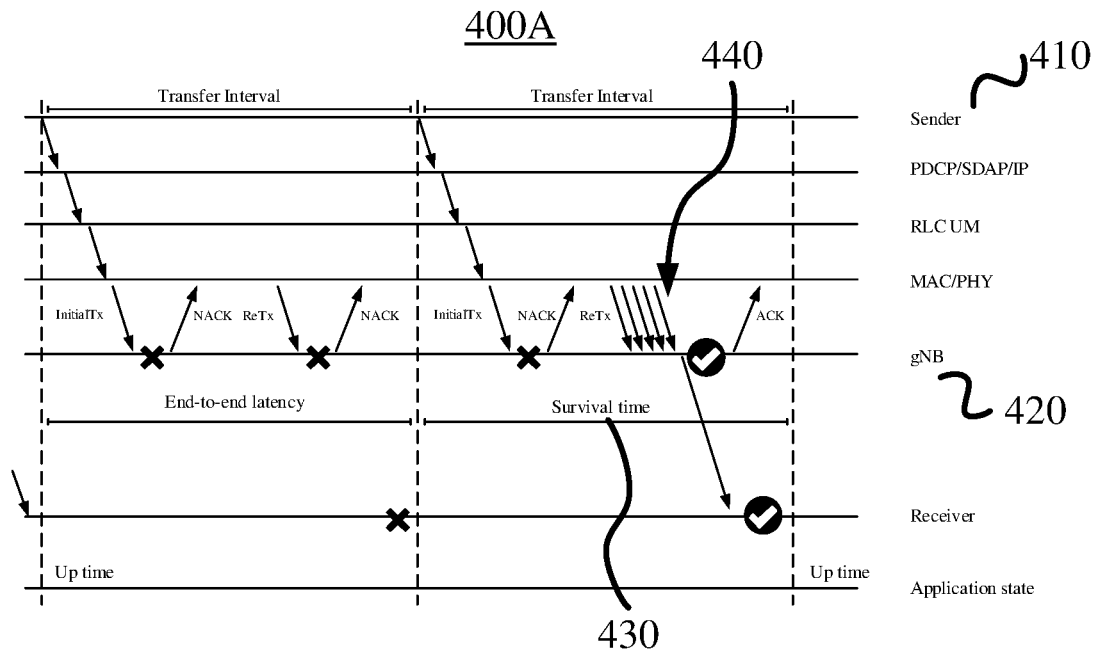
FIG. 4A illustrates an exemplary UL transmit scenario with the Configured Grant (CG) configuration in accordance with some embodiments.

FIG. 4A illustrates an exemplary UL transmit scenario 400A with the Configured Grant (CG) configuration in accordance with some embodiments. In FIG. 4A, similar reference numerals denote similar components and will not be repeated here.

In FIG. 4A, the UE 410 may support at least one HARQ process and the at least one CG configuration contain both the first group of parameters and the second group of parameters. In some embodiments, an indication triggers an application of the at least one CG configuration. A repetition of the retransmission 440 of the TB will be performed within a period, where the retransmission corresponding to the at least one HARQ process based on the second group of parameters in the at least one CG configuration.

In some embodiments, the period may contain survival time 430. The retransmission 440 may be performed within the survival tune 430.

Figure 4B:
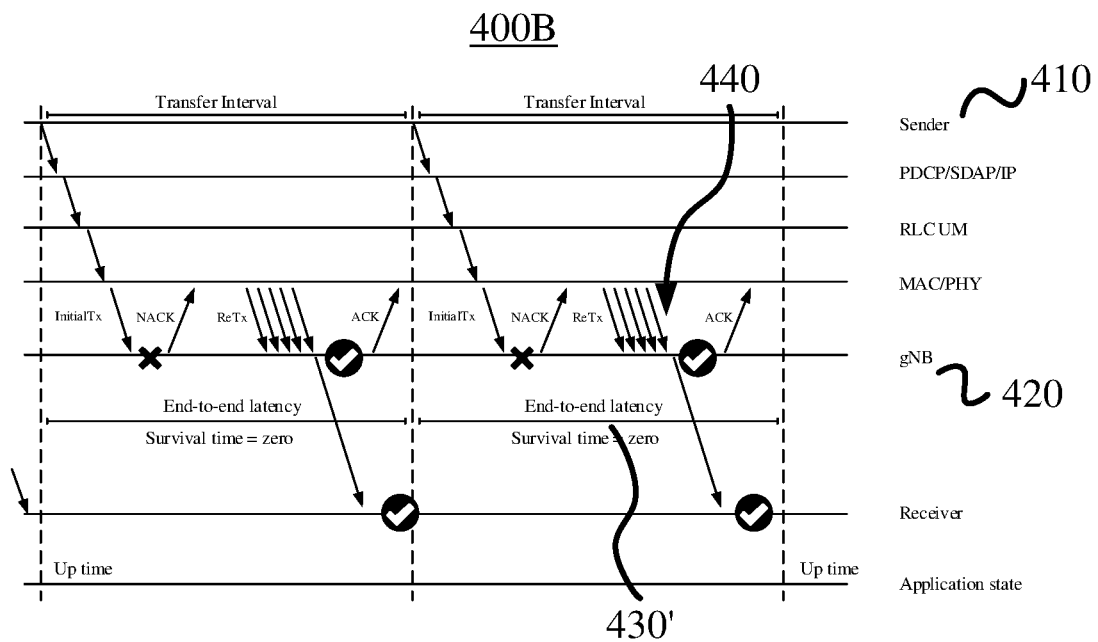
FIG. 4B illustrates another exemplary UL transmit scenario with the CC configuration in accordance with some embodiments.

FIG. 4B illustrates another exemplary UL transmit scenario 400B with the Configured Grant (CG) configuration in accordance with some embodiments. In FIG. 4A, similar reference numerals denote similar components and will not be repeated here.

In FIG. 4B, the at least one CG configuration contain both the first group of parameters and the second group of parameters as in the scenario 400A. In contrast to 400A, the survival time 430' in FIG. 4B is zero. A repetition of the retransmission 440 of the TB will be performed within the period.

In some variant, the HARQ initial transmission and HARQ retransmission 440 may use a different PHY configuration. By applying the CG configuration with the second group of parameters in the HARQ retransmission 440, the unacknowledged MAC Protocol Data Unit (PDU) sitting in the HARQ buffer can be retransmitted with more reliability, more repetitions, differently spaced in time and frequency, etc.

In addition, allowing HARQ retransmission in CG where certain CG parameters can be modified during the retransmission. As a result, the reliability of HARQ retransmission can be selectively adjusted according to the requirements of the service.

In some embodiments, CG configuration supplied with the second parameters may be as shown with highlighted part below:

```
ConfiguredGrantConfig ::=          SEQUENCE {
   frequencyHopping                     ENUMERATED {intraSlot, interSlot}
   OPTIONAL,       -- Need S
   cg-DMRS-Configuration                DMRS-UplinkConfig,
   mcs-Table                            ENUMERATED {qam256, qam64LowSE}
   OPTIONAL,       -- Need S
   mcs-TableTransformPrecoder           ENUMERATED {qam256, qam64LowSE}
   OPTIONAL,       -- Need S
   uci-OnPUSCH                          SetupRelease { CG-UCI-OnPUSCH }
```

-continued

```
OPTIONAL,        -- Need M
    resourceAllocation                  ENUMERATED { resourceAllocationType0,
resourceAllocationType1, dynamicSwitch },
    rbg-Size                            ENUMERATED {config2}
OPTIONAL,        -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}
OPTIONAL,        -- Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
OPTIONAL, -- Need R
    periodicity                         ENUMERATED {
                                            sym2, sym7, sym1x14, sym2x14, sym4x14, sym5x14,
sym8x14, sym10x14, sym16x14, sym20x14,
                                            sym32x14, sym40x14, sym64x14, sym80x14,
sym128x14, sym 160x14, sym256x14, sym320x14, sym512x14,
                                            sym640x14, sym1024x14, sym1280x14, sym2560x14,
sym5120×14,
                                            sym6, sym1x12, sym2x12, sym4x12, sym5x12,
sym8x12, sym10x12, sym16x12, sym20x12, sym32x12,
                                            sym40x12, sym64x12, sym80x12, sym128x12,
sym160x12, sym256x12, sym320x12, sym512×12, sym640x12,
                                            sym1280x12, sym2560x12
    },
    configuredGrantTimer                INTEGER (1..64)
OPTIONAL, -- Need R
    rrc-ConfiguredUplinkGrant           SEQUENCE {
        timeDomainOffset                    INTEGER (0..5119),
        timeDomainAllocation                INTEGER (0..15),
        frequencyDomainAllocation           BIT STRING (SIZE(18)),
        antennaPort                         INTEGER (0..31),
        dmrs-SeqInitialization              INTEGER (0..1)
OPTIONAL, -- Need R
        precodingAndNumberOfLayers          INTEGER (0..63),
        srs-ResourceIndicator               INTEGER (0..15)
OPTIONAL, -- Need R
        mcsAndTBS                           INTEGER (0..31),
        frequenceHoppingOffset              INTEGER (1.. maxNrofPhysicalResourceBlocks-1)
OPTIONAL, -- Need R
        pathlossReferenceIndex              INTEGER (0..maxNrofPUSCH-PathlossReferenceRSs-1),
        ...,
        [[
        pusch-RepTypeIndictor-r16           ENUMERATED {pusch-RepTypeA,pusch-RepTypeB}
OPTIONAL, -- Need M
        frequencyHoppingPUSCH-Rep-TypeB-r16 ENUMERATED {interRepetition, interSlot}
OPTIONAL, -- Cond RepTypeB
        timeReferenceSFN-r16                ENUMERATED {sfn512}
OPTIONAL -- Need S
        ]]
    }
OPTIONAL, -- Need R
    ...,
    [[
    cg-RetransmissionTimer-r16          INTEGER (1..64)
OPTIONAL, -- Need R
    cg-minDFI-Delay-r16                 ENUMERATED
                                            {sym7, sym1x14, sym2x14, sym3x14, sym4x14,
sym5x14, sym6x14, sym7x14, sym8x14
                                            sym9x14, sym10x4, sym11x14, sym12x14,
sym13x14, sym14x14,sym15x14, sym16x14
                                            }
OPTIONAL, -- Need R
    cn-nrofPUSCH-InSlot-r16             INTEGER (1..7)
OPTIONAL, -- Need R
    cg-nrofSlots-r16                    INTEGER (1..40)
OPTIONAL, -- Need R
    cg-StartingOffsets-r16              CG-StartingOffsets-r16
OPTIONAL, -- Need R
    cg-UCI-Multiplexing                 ENUMERATED {enabled}
OPTIONAL, -- Need R
    cg-COT-SharingList-r16              INTEGER (1..39)
OPTIONAL, -- Need R
    betaOffsetCG-UCI-r16                INTEGER (0..31)
OPTIONAL, -- Need R
    cg-COT-SharingList-r16              SEQUENCE (SIZE (1..1709)) OF CG-COT-Sharing-r16
OPTIONAL, -- Need R
    harq-ProcID-Offset-r16              INTEGER (0..15)
```

```
OPTIONAL, -- Need M
    harq-ProcID-Offset2-r16              INTEGER (0..15)
OPTIONAL, -- Need M
    configuredGrantConfigIndex-r16       ConfiguredGrantConfigIndex-r16
OPTIONAL, -- Cond CG-List
    configuredGrandConfigIndexMAC-r16    ConfiguredGrantConfigIndexMAC-r16
OPTIONAL, -- Cond CG-IndexMAC
    periodicityExt-r16                   INTEGER (1..5120)
OPTIONAL, -- Need R
    startingFromRV0-r16                  ENUMERATED {on, off}
OPTIONAL, -- Need R
    phy-PriorityIndex-r16                ENUMERATED {p0, p1}
OPTIONAL, -- Need R
    autonomousTx-r16                     ENUMERATED {enabled}
OPTIONAL, -- Cond LCH-BasedPrioritization
    ]]
...,
[[
    repK-ReTx-r17                        ENUMERATED {n1, n2, n4, n8}
OPTIONAL, -- Need R
]]
}
```

As shown, UE may use the CG configuration with the extra parameter repK-ReTx, as the member highlighted in the ConfiguredGrantConfig.

Alternatively, the extra parameter or the second group of parameters may be extended to other suitable parameters in a similar way (e.g., periodicity-ReTx, timeDomainOffset-ReTx, pusch-RepTypIndicator-ReTx, etc.).

In some embodiments, the period of the transfer interval may include survival time. The supplying the CG configuration with the second group of parameters may be valid during HARQ retransmission phase only. Thereby certain functions use can use different parameter values during initial transmission and retransmission/survival time.

In some embodiments, only a subset of parameters of the CG configuration may allowed to change. Also, the Transport Block Size (TBS) needs to stay the same.

In other variants, the feature of applying the CG configuration with the second group of parameters may be used during survival time only (reactive mode). Alternatively, it may be used for any HARQ retransmission, regardless of survival time (proactive mode). In some embodiments, a new UE capability can be added for such feature.

In some embodiments, the CG configuration with the second group of parameters may occur one-time. This is may be implemented by making the periodicity parameter in the ConfiguredGrantConfig optional. In other words, such a CG configuration does not have periodicity. Alternatively, the CG configuration may end after a predefined number of periodicities, that is, once started, the CG ends automatically after predefined number of transmit occasions. This may require a new parameter in ConfiguredGrantConfig. In addition, one-time transmission or multiple retransmissions can be possible based on functional definition in the procedure. Multiple retransmissions may use periodicity-ReTx.

In some embodiments, fox the HARQ retransmission, the same HARQ process is invoked, this is, the CG keeps using the same HARQ ID and the same CG index.

In some embodiments, the indication that triggers the application of the CG configuration with the second group of parameters may be when the CG retransmission triggered by a Downlink Control Information (DCI) addressed to CS-RNTI with NDI=1 for a HARQ ID on a given CC/cell. Typically a single CG Physical Uplink Shared Channel (PUSCH) occasion only (no periodicity) This can be enabled through L1 config.

In some variants, HARQ retransmission may occur automatically at the next regular CG occasion. Alternatively, it may not need to wait until the next CG occasion, but early start by a different offset and periodicity.

In some embodiments, the validity period of the second group parameters for the HARQ retransmission ends at expiry of the configuredGrantTimer.

Figure 5:
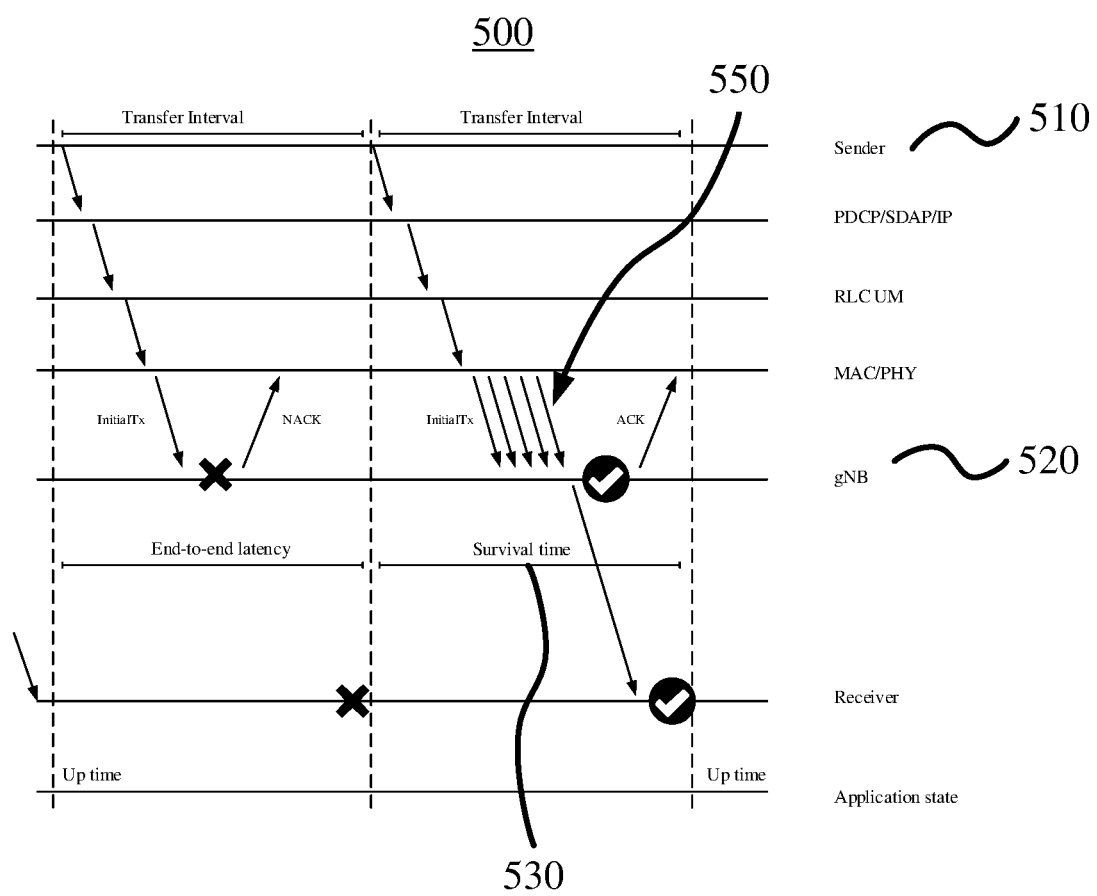
FIG. 5 illustrates another exemplary UL transmit scenario with the CG configuration in accordance with some embodiments.

FIG. 5 illustrates another exemplary UL transmit scenario 500 with the CG configuration in accordance with some embodiments. In FIG. 5, similar reference numerals denote similar components and will not be repeated here. A repeating of initial transmission 550 of TB was performed within the survival time 530.

In some embodiments illustrated by FIG. 5, the at least one CG configuration comprise a plurality of CG configurations. A first CG configuration of the plurality of CG configurations comprises the first group of parameters, and a second CG configuration of the plurality of CG configurations comprises the second group of parameters. In some variants, the first CG configuration and the second CG configuration indicate a same CG resource.

In some embodiments, a network can configure an alternative configuredGrantConfig together with the existing configuredGrantConfig. The alternative configuredGrantConfig provides a variant of CG configuration for an existing CG, that is, only one of the two CG configurations can be used at a time. The alternative CG configuration can be dynamically enabled/disabled.

In some embodiments, the first CG configuration may be the existing configuredGrantConfig. The second CG configuration may be the alternative configuredGrantConfig.

In some implementations, an indication is determined, which triggers an application between the first CG configuration and the second CG configuration.

In some embodiments, the initial transmission may be included in the extra protection. It is useful when the latency is very short such that there is no time for HARQ retransmission or when an extra level of protection is required due to other factors. It may as well be useful in scenarios where message retransmission by upper layer is application.

In the scenario 500, the transfer interval includes survival time 530. In some embodiments, the latency for some applications may be very short and there is no time for HARQ retransmission. When the indication triggers additional reliability, according to some embodiments, the initial transmission 550 of TB applies the alternative CG configuration. It is repeated, within the survival time 530, based on the second group of parameters in the second CG configuration.

Figure 6:
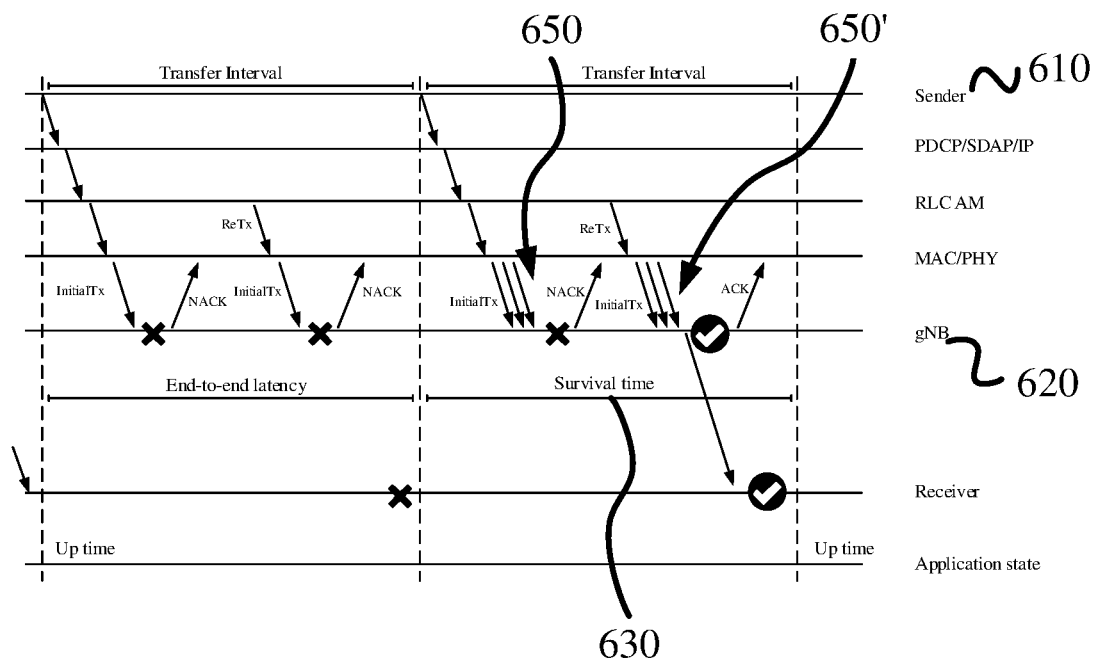
FIG. 6 illustrates yet another exemplary UL transmit scenario with the CG configuration in accordance with some embodiments.

FIG. 6 illustrates another exemplary UL transmit scenario 600 with the CG configuration in accordance with some embodiments. In FIG. 6, similar reference numerals denote similar components and will not be repeated here. A repeating of initial transmission 650 and 650' was performed within the survival time 630.

In FIG. 6, latency for some applications is slightly larger than the latency in FIG. 5. Here, the number of TB transmission repetitions for the initial transmission 650 and 650' is lower than in the FIG. 5. In some embodiments, the initial transmission 650 and 650' apply the alternative CG configuration. The first repetition of the initial transmission 650 still fail after repeating transmitting, although the initial transmission 650 applies the alternative CG configuration. It may due to the radio conditions are really bad. However, in the next attempt, triggered by Radio Link Control (RLC) retransmission, the initial transmission 650' succeeds.

In some embodiments, the first CG configuration or the existing CG configuration may be the configuredGrantConfig. In addition, the second CG configuration or the alternative CG configuration may be as shown as the highlighted part below:

```
-- ASN1START
-- TAG-BWP-UPLINKDEDICATED-START
BWP-UplinkDedicated ::=                          SEQUENCE {
    pucch-Config                                     SetupRelease { PUCCH-Config }
OPTIONAL, -- Need M
    pusch-Config                                     SetupRelease { PUSCH-Config }
OPTIONAL, -- Need M
    configuredGrantConfig                            SetupRelease { ConfiguredGrantConfig }
OPTIONAL, -- Need M
    srs-Config                                       SetupRelease { SRS-Config }
OPTIONAL, -- Need M
    beamFailureRecoveryConfig                        SetupRelease { BeamFailureRecoveryConfig }
OPTIONAL, -- Cond SpCellOnly
    ...,
    [[
    sl-PUCCH-Config-r16                              SetupRelease { PUCCH-Config }
OPTIONAL, -- Need M
    cp-ExtensionC2-r16                               INTEGER (1..28)
OPTIONAL, -- Need R
    cp-ExtensionC3-r16                               INTEGER (1..28)
OPTIONAL, -- Need R
    useInterlacePUCCH-PUSCH-r16                      ENUMERATED {enabled}
OPTIONAL, -- Need R
    pucch-ConfigurationList-r16                      SetupRelease { PUCCH-ConfigurationList-r16 }
OPTIONAL,-- Need M
    lbt-FailureRecoveryConfig-r16                    SetupRelease { LBT-FailureRecoveryConfig-r16 }
OPTIONAL, -- Need M
    configuredGrantConfigToAddModList-r16                        ConfiguredGrantConfigToAddModList-r16
OPTIONAL,-- Need N
    configuredGrantConfigToReleaseList-r16                       ConfiguredGrantConfigToReleaseList-r16
OPTIONAL,-- Need N
    configuredGrantConfigType2DeactivationStateList-r16
ConfiguredGrantConfigType2DeactivationStateList-r16    OPTIONAL, -- Need R
    ]]
    ...,
    [[
    configuredGrantAlternativeConfig-r17    SetupRelease { ConfiguredGrantConfig }
OPTIONAL       -- Need M
    ]]
}
ConfiguredGrantConfigToAddModList-r16         ::= SEQUENCE (SIZE (1..maxNrofConfiguredGrantConfig-r16)) OF
ConfiguredGrantConfig
ConfiguredGrantConfigToReleaseList-r16        ::= SEQUENCE (SIZE (1..maxNrofConfiguredGrantConfig-r16)) OF
ConfiguredGrantConfigIndex-r16
ConfiguredGrantConfigType2DeactivationState-r16 ::= SEQUENCE (SIZE (1..maxNrofConfiguredGrantConfig-r16))
OF ConfiguredGrantConfigIndex-r16
ConfiguredGrantConfigType2DeactivationStateList-r16    ::=
                         SEQUENCE (SIZE (1..maxNrofCG-Type2DeactivationState)) OF
ConfiguredGrantConfigType2DeactivationState-r16
-- TAG-BWP-UPLINKDEDICATED-STOP
    -- ASN1STOP
```

As shown, the second CG configuration or the alternative CG configuration may be the parameter configuredGrantAlternativeConfig in the BWP-UplinkDedicated. The first CG configuration or the existing CG configuration may be the parameter configuredGrantConfig in the BWP-UplinkDedicated. Alternatively, other solutions may be possible.

In some embodiments, the configuredGrantAlternativeConfig IE uses the exact same CG indices (configuredGrantConfigIndex, configuredGrantConfigIndexMAC) and HARQ process IDs (nrofHARQ-Processes) as ConfiguredGrantConfig but with a different set of parameters. The configuredAlternativeConfig may contain just the delta to configuredGrantConfig, or it may be a full new configuration (including different TBS).

In some embodiments, the full new configuration option might be used for initial transmission, for example, when new data arrives during survival time and a new TBS or a sufficiently different CG configuration is desired. The delta option might be suitable for HARQ ReTx, utilizing the same TBS. However, this is not fixed and both options may be used in all combinations.

In addition, the first CG configuration or the existing CG configuration. i.e. configuredGrantConfig, as the base hst. The configuredGrantAlternativeConfig only contains CG entries that require different treatment, as not all logical channels may require multiple CG configurations. If a particular CG index is present in one CG configuration only then it shall be present in the configuredGrantConfig and not present m configuredGrantAlternativeConfig. Also, in case of a HARQ retransmission, the same HARQ buffer can be used.

In some variants, the CG index connect (overlays) different CG configurations for the same CG, all Logical Channel Prioritization (LCP) restrictions (allowedCG-List-r16) apply in the same way to both sets of CG configurations. Therefore, there is no changed to LCP restrictions needed.

In some embodiments, the alternative CG configuration (configuredGrantAlternativeConfig) may be applied when triggered/enabled by the indication, for example, during "survival time" on a specific Logical Channel (LCH) or when enabled by a start event.

In some embodiments, the applicability of configuredGrantAlternativeConfig may be based on the network configuration, for the following options: InitialTx-and-ReTx, InitialTx-only or ReTx-only.

In some variants, whether or not a configuredGrantAlternativeConfig is provided for a given CG is optional. If there is no entry in the list, for example CG index 1, then the original CG configuration is used. Any index that is present in the configuredGrantAlternativeConfig is a shadow configuration of the configuredGrantConfig. It may be possible to signal the delta only, i.e. only indicate parameters that are different.

In some embodiments, the indication that triggers the application of the alternative CG configuration may include the following options:

Option 1 The configuredGrantAlternativeConfig can be activated for specific CG configurations only, based on network (NW) configuration.

Option 2: The configuredGrantAlternativeConfig can be activated for all CGs associated with a LCH.

Option 3: The configuredGrantAlternativeConfig can be activated per BWP (for all CGs).

Option 4: If the configuredGrantAlternativeConfig is used for HARQ ReTx and activated via the DCI like in solution 1, there could be a new bit on the DCI to indicate which CG config (alternative configuration or normal configuration) to use. Whether to use ReTx via DG as in legacy, ReTx via CG, or ReTx via AltCG can be controlled with that bit on the DCI/or even with an explicit RRC parameter. If the bit is not present then ReTx via DG as usual.

In some embodiments, the configuredGrantAlternativeConfig may be valid for single or multiple CG transmit occasions. In the single transmit occasion, the parameter 'periodicity' may be made optional within the base ConfiguredGrantConfig. Also, both 'periodicity' and 'periodicityExt-r16' are not present in ConfiguredGrantConfig. Alternatively, in multiple transmit occasions, the transmission may based on periodicity and offset plus a new parameter to indicate the number of CG transmission.

In some embodiments, the usage of configuredGrantAlternativeConfig can be subject to set of separate conditions. When conditions apply, the UE may use configuredGrantAlternativeConfig autonomously. In some variants, a new UE capability may be defined for this function.

In some embodiments where HARQ retransmission can be performed, the UE supports at least one HARQ process. The transmission of the TB is the retransmission of the TB corresponding to the at least one HARQ process based on the second group of parameters in the second CG configuration. In some variants, the second CG configuration may be as shown as the highlighted part below:

```
-- ASN1START
-- TAG-BWP-UPLINKDEDICATED-START
BWP-UplinkDedicated ::=                         SEQUENCE {
    pucch-Config                                SetupRelease { PUCCH-Config }
OPTIONAL, -- Need M
    pusch-Config                                SetupRelease { PUSCH-Config }
OPTIONAL, -- Need M
    configuredGrantConfig                       SetupRelease { ConfiguredGrantConfig }
OPTIONAL, -- Need M
    srs-Config                                  SetupRelease { SRS-Config }
OPTIONAL, -- Need M
    beamFailureRecoveryConfig                   SetupRelease { BeamFailureRecoveryConfig }
OPTIONAL, -- Cond SpCellOnly
    ...,
    [[
    sl-PUCCH-Config-r16                         SetupRelease { PUCCH-Config }
OPTIONAL, -- Need M
    cp-ExtensionC2-r16                          INTEGER (1..28)
OPTIONAL,-- Need R
    cp-ExtensionC3-r16                          INTEGER (1..28)
OPTIONAL,-- Need R
    useinterlacePUCCH-PUSCH-r16                 ENUMERATED {enabled}
OPTIONAL,-- Need R
    pucch-ConfigurationList-r16                 SetupRelease { PUCCH-ConfigurationList-r16 }
OPTIONAL,-- Need M
    lbt-FailureRecoveryConfig-r16               SetupRelease { LBT-FailureRecoveryConfig-r16 }
OPTIONAL,-- Need M
    configuredGrantConfigToAddModList-r16               ConfiguredGrantConfigToAddModList-r16
OPTIONAL,-- Need N
    configuredGrantConfigToReleaseList-r16              ConfiguredGrantConfigToReleaseList-r16
OPTIONAL,-- Need N
    configuredGrantConfigType2DeactivationStateList-r16
```

```
ConfiguredGrantConfigType2DeactivationStateList-r16      OPTIONAL,   -- Need R
    ]]
    ...
    [[
    configuredGrantRetransmissionConfig-r17 SetupRelease { ConfiguredGrantConfig }
OPTIONAL       -- Need M
    ]]
}
ConfiguredGrantConfigToAddModList-r16              ::= SEQUENCE (SIZE (1..maxNrofConfiguredGrantConfig-r16)) OF
ConfiguredGrantConfig
ConfiguredGrantConfigToReleaseList-r16             ::= SEQUENCE (SIZE (1..maxNrofConfiguredGrantConfig-r16)) OF
ConfiguredGrantConfigIndex-r16
ConfiguredGrantConfigType2DeactivationState-r16 ::= SEQUENCE (SIZE (1..maxNrofConfiguredGrantConfig-r16))
OF ConfiguredGrantConfigIndex-r16
ConfiguredGrantConfigType2DeactivationStateList-r16      ::=
                      SEQUENCE (SIZE (1..maxNrofCG-Type2DeactivationState)) OF
ConfiguredGrantConfigType2DeactivationState-r16
-- TAG-BWP-UPLINKDEDICATED-STOP
    -- ASN1STOP
```

As shown, the second CG configuration of the retransmission CG configuration may be the parameter configuredGrantRetransmissionConfig in the BWP-UplinkDedicated. The first CG configuration or the existing CG configuration may be the parameter configuredGrantConfig in the BWP-UplinkDedicated. Alternatively, other solutions may be possible.

In some embodiments, the one or more messages may comprise a LCP signaling for LCP restrictions. A LogicalChannelConfig of the LCP signaling indicates at least two CG lists with LCP restrictions. In some variants, the at least two CG lists may comprise a first CG list and a second CG list. The first CG list may comprise existing CG list in the LogicalChannelConfig. For a given LCH, a part of CG is can be mapped to the existing CG list and another part of the CGs (that is, different CGs) can be mapped to the second CG list. The CG configuration associated with the CGs mapped to the second CG list comprise at least one parameter that is different from a parameter of the CG configuration associated with the CGs mapped the existing CG list. In addition, a first indication activates an application of the CGs mapped to the second CG list, and a second indication deactivates the application of the CGs mapped to the second CG list.

In some embodiments, the second CG list may be as shown as highlighted part below:

```
-- ASN1START
-- TAG-LOGICALCHANNELCONFIG-START
LogicalChannelConfig ::=                 SEQUENCE {
    ul-SpecificParameters                SEQUENCE {
        priority                             INTEGER (1 .. 16),
        prioritisedBitRate                   ENUMERATED {kBps0, kBps8, kBps16, kBps32, kBps64,
kBps128, kBps256, kBps512,
                                                 kBps1024, kBps2048, kBps4096, kBps8192, kBps16384,
kBps32768, kBps65536, infinity},
        bucketSizeDuration                   ENUMERATED {ms5, ms10, ms20, ms50, ms100, ms150,
ms300, ms500, ms1000,
                                                 spare7, spare6, spare5, spare4,
spare3,spare2, spare1},
        allowedServingCells                  SEQUENCE (SIZE (1 .. maxNrofServingCells-1)) OF ServCellIndex
OPTIONAL, -- PDCP-CADuplication
        allowedSCS-List                      SEQUENCE (SIZE (1 .. maxSCSs)) OF SubcarrierSpacing
OPTIONAL,       -- Need R
        maxPUSCH-Duration                    ENUMERATED {ms0p02, ms0p04, ms0p0625, ms0p125,
ms0p25, ms0p5, spare2, spare1}
OPTIONAL,       -- Need R
        configuredGrantType1Allowed          ENUMERATED {true}
OPTIONAL,       -- Need R
        logicalChannelGroup                  INTEGER (0 .. maxLCG-ID)
OPTIONAL,       -- Need R
        schedulingRequestID                  SchedulingRequestId
OPTIONAL,       -- Need R
        logicalChannelSR-Mask                BOOLEAN,
        logicalChannelSR-DelayTimerApplied   BOOLEAN,
        ...,
        bitRateQueryProhibitTimer            ENUMERATED {s0, s0dot4, s0dot8, s1dot6, s3, s6, s12, s30}
OPTIONAL,       -- Need R
        [[
        allowedCG-List-r16                   SEQUENCE (SIZE (0..maxNrofConfiguredGrantConfigMAC-r16-
1)) OF ConfiguredGrantConfigIndexMAC-r16
OPTIONAL, -- Need S
        allowedPHY-PriorityIndex-r16         ENUMERATED {p0, p1}
OPTIONAL:       -- Need S
        ]]
        ...,
        [[
```

```
    allowedDormantCG-List-r17           SEQUENCE (SIZE (0..maxNrofConfiguredGrantConfigMAC-
r16-1) OF ConfiguredGrantConfigIndexMAC-r16
OPTIONAL       -- Need S
   ]]
  }
OPTIONAL, -- Cond UL
  ...,
  [[
    channelAccessPriority-r16          INTEGER (1 .. 4)
OPTIONAL, -- Need R
    bitRateMultiplier-r16              ENUMERATED {x40, x70, x100, x200}
OPTIONAL -- Need R
   ]]
 }
-- TAG-LOGICALCHANNELCONFIG-STOP
   -- ASN1STOP
```

As shown, the first CG list or the existing CG list may be allowed CG-List and the second CG list is the allowedDormantCG-List-r17. In some embodiments, a dormant CG is a normal CG that is defined through configuredGrantConfig. Just like a normal CG, it needs to be activated before use. The UE does not use it for most of the time. It remains dormant until a failure or an event occurs (ex. a first indication), only then the UE is allowed to use it. In some variants, the UE can use it autonomously or as an option after the NW configuration.

In some embodiments, the dormant CG list is used under special circumstances only. For example, during survival time ox for temporary recovery under bad radio conditions, at pre-defined conditions. This allows for fast adjustment without the need to configure or update additional CGs In some implementations, COs mapped to the allowedDonnantCG-List-r17 may have higher reliability, shorter periodicity, different number of TB repetitions, etc.

In some embodiments, a dormant CG is already activated beforehand (e.g., as a type1 CG via RRC), but it is not used until the new LOP restriction is active. The conditions or the first indication to activate the new LCP restriction may be pre-configured, thereby UE can use it autonomously, such as survival time start event, RRC configuration or other conditions. In addition, a dormant LCP restriction may be deactivated through a set of pre-defined events, such as survival time end event (or expiry of the survival time, if configured), RRC configuration, max number of CG transmit occasions reached or other conditions.

In some variants, some CGs may be limited to a maximum number of CG transmit occasions. With that, the CG has a validity period in units of periodicity. When the configured max number of consecutive transmit occasions is exhausted, the CG becomes dormant again.

In some embodiment, the LCP restriction for dormant CGs may be configured to be automatic activated/deactivated or permanent configured.

In some embodiment, the existing CG hst (allowedCG-List-r16) may be extended with two sub-list comprising the first CG list and the second CG list.

FIG. 7 illustrates a flowchart for an exemplary method by a UE. In FIG. 7, the method 700 comprises step 710 and step 720.

In step 710, the UE acquires, from a Base Station (BS), one or more messages comprising a first group of parameters and a second group of parameters of one or more Semi-Persistent Scheduling (SPS) configuration in a bandwidth part (BWP) of a cell. At least one SPS configuration with the second group of parameters indicates a plurality of transmission occasions within a period.

In step 720, repeating transmission of a TB in the plurality of transmission occasions based on the at least one SPS configuration.

In some embodiments, the first group of parameters comprise a SPS-Config and the second group of parameters comprise at least one parameter that is different from the SPS-Config.

In some embodiments, the second group of parameters may be as shown as highlighted part below:

```
          -- ASN1START
          -- TAG-SPS-CONFIG-START
          SPS-Config ::=                SEQUENCE {
               periodicity              ENUMERATED {ms10, ms20, ms32, ms40, ms64, ms80, ms128,
ms160, ms320, ms640,
                                                     spare6, spare5, spare4, spare3, spare2,
spare1},
               nrofHARQ-Processes       INTEGER (1..8),
               n1PUCCH-AN                                          PUCCH-ResourceId
          OPTIONAL,  -- Need M
               mcs-Table                                           ENUMERATED {qam64LowSE}
          OPTIONAL,   -- Need S
               ...,
               [[
               sps-Configindex-r16                                 SPS-ConfigIndex-r16
          OPTIONAL, -- Cond SPS-List
               harq-ProcID-Offset-r16                              INTEGER   (0..15)
          OPTIONAL, -- Need R
               periodicityExt-r16                                  INTEGER (1..5120)
          OPTIONAL, -- Need R
               harq-CodebookID-r16                                 INTEGER (1..2)
          OPTIONAL, -- Need R
```

```
    pdsch-AggregationFactor-r16              ENUMERATED {n1, n2, n4, n8 }
OPTIONAL, -- Need S
        ]]
        ...,
        [[
    pdsch-AggregationFactorReTx-r17          ENUMERATED {n1, n2, n4, n8 }
OPTIONAL -- Need S
        ]]
    }
-- TAG-SPS-CONFIG-STOP
-- ASN1STOP
```

As shown, SPS-Config has extra parameter or the second group of parameters, which is pdsch-AggregationFactor-ReTx.

In some embodiments, the at least one SPS configuration comprise both the first group of parameters and the second group of parameters. In some embodiments, the at least one SPS comprise a plurality of SPS configurations. A first SPS configuration of the plurality of SPS configurations comprises the first group of parameters, and a second SPS configuration of the plurality of SPS configurations comprises the second group of parameters.

In come embodiments, the second SPS configuration may be as shown as the highlighted part below:

```
-- ASN1START
-- TAG-BWP-DOWNLINKDEDICATED-START
BWP-DownlinkDedicated ::=        SEQUENCE {
    pdcch-Config                     SetupRelease { PDCCH-Config }
OPTIONAL, - Need M
    pdsch-Config                     SetupRelease { PDSCH-Config }
OPTIONAL, -- Need M
    sps-Config                       SetupRelease { SPS-Config }
OPTIONAL, -- Need M
    radioLinkMonitoringConfig        SetupRelease { RadioLinkMonitoringConfig }
OPTIONAL, -- Need M
    ...,
    [[
    sps-ConfigToAddModList-r16       SPS-ConfigToAddModList-r16
OPTIONAL, -- Need N
    sps-ConfigToReleaseList-r16      SPS-ConfigToReleaseList-r16
OPTIONAL, -- Need N
    sps-ConfigDeactivationStateList-r16 SPS-ConfigDeactivationStateList-r16
OPTIONAL, - Need R
    beamFailureRecoverySCellConfig-r16  SetupRelease {BeamFailureRecoverySCellConfig-r16}
OPTIONAL, -- Cond SCellOnly
    sl-PDCCH-Config-r16              SetupRelease { PDCCH-Config }
OPTIONAL, -- Need M
    sl-V2X-PDCCH-Config-r16          SetupRelease { PDCCH-Config }
OPTIONAL, -- Need M
    ]]
    ...,
    [[
    sps-AlternativeConfig-r17        SetupRelease { SPS-Config }
OPTIONAL -- Need M
    ]]
}
SPS-ConfigToAddModList-r16 ::=        SEQUENCE (SIZE (1..maxNrofSPS-Config-r16)) OF SPS-Config
SPS-ConfigToReleaseList-r16 ::=       SEQUENCE (SIZE (1..maxNrofSPS-Config-r16)) OF SPS-ConfigIndex-r16
SPS-ConfigDeactivationStateList-r16 ::=  SEQUENCE (SIZE (1..maxNrofSPS-Config-r16)) OF SPS-ConfigIndex-r16
SPS-ConfigDeactivationStateList-r16 ::= SEQUENCE (SIZE (1..maxNrofSPS-DeactivationSate)) OF SPS-
ConfigDeactivationState-r16
-- TAG-BWP-DOWNLINKDEDICATED-STOP
    -- ASN1STOP
```

As shown, the second SPS configuration may be sps-AlternativeConfig in the BWP-DownlinkDedicated and the first SPS configuration may be sps-config in the BWP-DownlinkDedicated.

In another embodiment, the second SPS configuration may also be as shown as the highlighted part below:

```
-- ASN1START
-- TAG-BWP-DOWNLINKDEDICATED-START
    BWP-DownlinkDedicated ::=        SEQUENCE {
        pdcch-Config                         SetupRelease { PDCCH-Config }
OPTIONAL,       -- Need M
        pdsch-Config                         SetupRelease { PDSCH-Config }
OPTIONAL,       -- Need M
        sps-Config                           SetupRelease { SPS-Config }
OPTIONAL,       -- Need M
        radioLinkMonitoringConfig            SetupRelease { RadioLinkMonitoringConfig }
OPTIONAL,       -- Need M
        ...,
        [[
        sps-ConfigToAddModList-r16           SPS-ConfigToAddModList-r16
OPTIONAL,       -- Need N
        sps-ConfigToReleaseList-r16          SPS-ConfigToReleaseList-r16
OPTIONAL,       -- Need N
        sps-ConfigDeactivationStateList-r16  SPS-ConfigDeactivationStateList-r16
OPTIONAL,       -- Need R
        beamFailureRecoverySCellConfig-r16   SetupRelease {BeamFailureRecoverySCellConfig-r16}
OPTIONAL,       -- Cond SCellOnly
        sl-PDCCH-Config-r16                  SetupRelease { PDCCH-Config }
OPTIONAL,       -- Need M
        sl-V2X-PDCCH-Config-r16              SetupRelease { PDCCH-Config }
OPTIONAL,       -- Need M
        ]]
        ...,
        [[
        sps-RetransmissionConfig-r17         SetupRelease { SPS-Config }
OPTIONAL        -- Need M
        ]]
    }
    SPS-ConfigToAddModList-r16 ::=       SEQUENCE (SIZE (1..maxNrofSPS-Config-r16)) OF SPS-Config
    SPS-ConfigToReleaseList-r16 ::=      SEQUENCE (SIZE (1..maxNrofSPS-Config-r16)) OF SPS-ConfigIndex-r16
    SPS-ConfigDeactivationState-r16 ::=  SEQUENCE (SIZE (1..maxNrofSPS-Config-r16)) OF SPS-ConfigIndex-r16
    SPS-ConfigDeactivationStateList-r16 ::= SEQUENCE (SIZE (1..maxNrofSPS-DeactivationState)) OF SPS-ConfigDeactivationState-r16
-- TAG-BWP-DOWNLINKDEDICATED-STOP
-- ASN1STOP
```

As shown, the second SPS configuration may be sps-RetransmissionConfig in the BWP-DownlinkDedicated and the first SPS configuration may be sps-Config in the BWP-DownlinkDedicated.

FIG. 8 illustrates a flowchart for an exemplary method by a BS. As shown in FIG. 8, the method 800 comprises step 810 and step 820.

In step 810, the BS generates one or more messages for transmitting to user equipment (UE), wherein the one or more messages comprises a first group of parameters and a second group of parameters of one or more Configured Grant (CG) configuration in a bandwidth part (BWP) of a cell, wherein at least one CG configuration with the second group of parameters indicates a plurality of transmission occasions within a period.

In step 820, the BS receives a repeated transmission of a Transport Block (TB) in the plurality of transmission occasions.

In some embodiments, the first group of parameters comprise a ConfiguredGrantConfig and wherein the second group of parameters comprise at least one parameter that is different from the ConfiguredGrantConfig.

In some embodiments, the repeated transmission of the TB is a repeated initial transmission of TB or a repeated retransmission of TB.

In some embodiments, the UE supports at least one Hybrid Automatic Repeated Request (HARQ) process and the at least one CG configuration comprise both the first group of parameters and the second group of parameters.

In some embodiments, the BS transmits an indication triggering an application of the at least one CG configuration. The repeated transmission of TB is the repeated retransmission of TB corresponding to the at least one HARQ process based on the second group of parameters in the at least one CG configuration.

In some embodiments, the at least one CG configuration comprise a plurality of CG configurations. A first CG configuration of the plurality of CG configurations comprises the first group of parameters, and a second CG configuration of the plurality of CG configurations comprises the second group of parameters.

In some embodiments, the first CG configuration and the second CG configuration indicate a same CG.

In some embodiments, the BS transmits an indication triggering an application of the second CG configuration.

In some embodiments, the period comprises survival time In some embodiments, the repeated transmission of the TB is, within the survival time, a repeated initial transmission of TB or a repeated retransmission of TB.

In some embodiments, the UE supports at least one Hybrid Automatic Repeated Request (HARQ) process. The repeated transmission of TB is the repeated retransmission of TB corresponding to the at least one HARQ process based on the second group of parameters in the second CG configuration.

In some embodiments, the one or more message comprising a Logical Channel Prioritization (LCP) signaling, wherein a LogicalChannelConfig of the LCP signaling indicates at least two CG lists with LCP restrictions.

In some embodiments, the at least two CG lists comprise a first CG list and a second CG list. The first CG list comprises existing CG list in the LogicalChannelConfig. A part of CGs can be mapped to the existing CG list and another part of the CGs can be mapped to the second CG list. In addition, the CG configuration associated with the CGs mapped to the second CG list comprise at least one parameter that is different from a parameter of the CG configuration associated with the CGs mapped the existing CG list. A first indication activates an application of the CGs mapped to the second CG list. A second indication deactivates the application of the CGs mapped to the second CG list.

FIG. 9 illustrates a flowchart for an exemplary method by a BS. As shown in FIG. 9, the method 900 comprises step 910 and step 920.

In step 910, the BS generates one or more messages for transmitting to user equipment (UE), wherein the one or more messages comprise a first group of parameters and a second group of parameters of one or more Semi-Persistent Scheduling (SPS) configuration m a bandwidth part (BWP) of a cell, wherein at least one SPS configuration with the second group of parameters indicates a plurality of transmission occasions within a period.

In step 920, the BS receives a repeated transmission of a Transport Block (TB) in the plurality of transmission occasions.

In some embodiments, the first group of parameters comprise a SPS-Config and wherein the second group of parameters comprise at least one parameter that is different from the SPS-Config.

In some embodiments, at least one SPS configuration comprise both the first group of parameters and the second group of parameters.

In some embodiments, the at least one SPS comprise a plurality of SPS configurations. A first SPS configuration of the plurality of SPS configurations comprises the first group of parameters, and a second SPS configuration of the plurality of SPS configurations comprises the second group of parameters.

Figure 10:
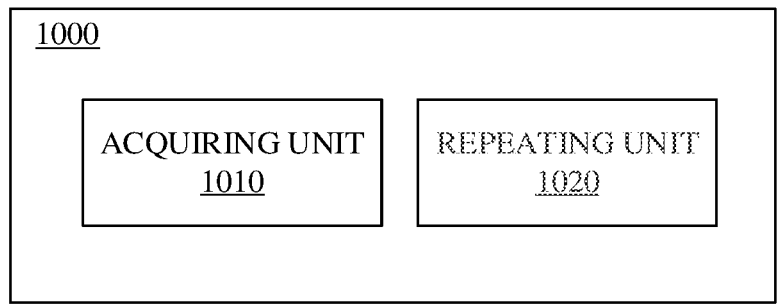
FIG. 10 illustrates an exemplary block diagram of an apparatus for a UE in accordance with some embodiments.

FIG. 10 illustrates an exemplary block diagram of an apparatus 1000 for a UE in accordance with some embodiments. The apparatus 1000 illustrated in FIG. 10 may be used to implement the method 300 as illustrated in combination with FIG. 3.

As shown in FIG. 10, the apparatus 1000 includes acquiring unit 1010 and repeating unit 1020.

The acquiring unit 1010 may be configured to acquire, from a Base Station (BS), one or more messages comprising a first group of parameters and a second group of parameters of one or more Configured Grant (CG) configurations in a bandwidth part (BWP) of a cell, wherein at least one CG configuration with the second group of parameters indicates a plurality of transmission occasions within a period.

The repeating unit 1020 may be configured to repeat transmission of a Transport Block (TB) in the plurality of transmission occasions based on the at least one CG configuration.

Figure 11:
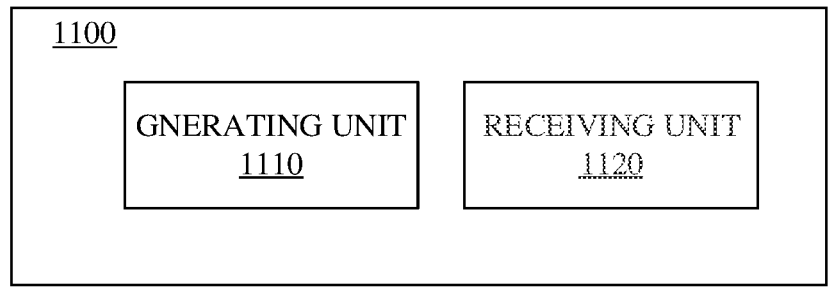
FIG. 11 illustrates an exemplary block diagram of an apparatus for a BS in accordance with same embodiments.

FIG. 11 illustrates an exemplary block diagram of an apparatus for a BS in accordance with same embodiments. The apparatus 1100 illustrated in FIG. 11 may be used to implement the method 800 as illustrated in combination with FIG. 8.

As shown in FIG. 11, the apparatus 1110 includes generating unit 1120 and receiving unit 1020.

The generating unit 1120 may be configured to generate one or more messages for transmitting to user equipment (UE), wherein the one or more messages comprises a first group of parameters and a second group of parameters of one or more Configured Grant (CG) configuration in a bandwidth part (BWP) of a cell, wherein at least one CG configuration with the second group of parameters indicates a plurality of transmission occasions within a period.

The receiving unit 1120 may be configured to receive a repeated transmission of a Transport Block (TB) in the plurality of transmission occasions.

Figure 12:
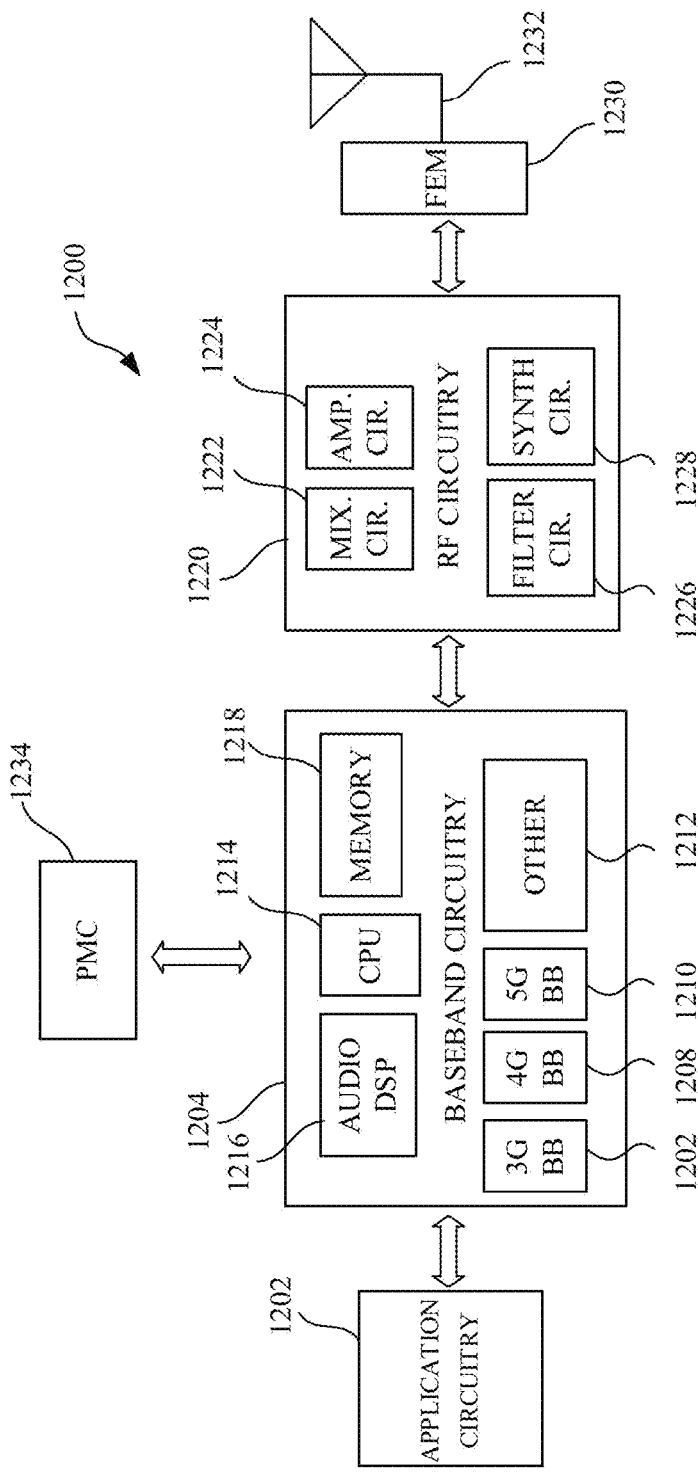
FIG. 12 illustrates example components of a device 1200 in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.) The processors may be coupled with or may include memory/storage and may be configured to execute instructions stored in the memory/storage to enable various applications of operating systems to run on the device 1200. In some embodiments, processors of application circuitry 1202 may process IP data packets received from an EPC.

The baseband circuitry 1204 may include circuitry such as, but not limited to, one or more single-core of multi-core processors. The baseband circuitry 1204 may include one ox more baseband processors of control logic to process baseband signals received from a receive signal path of the RF circuitry 1220 and to generate baseband signals for a transmit signal path of the RE circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some of all of the functionality of the illustrated baseband processors may be included in modules stored in the memory 1218 and executed via a Central Processing ETnit (CPET 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some of all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission.

In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path. In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) ox band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the Synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional-N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RE circuitry 1220 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g. N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N of N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a EGE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230

In some embodiments, the PMC 1234 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and m order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
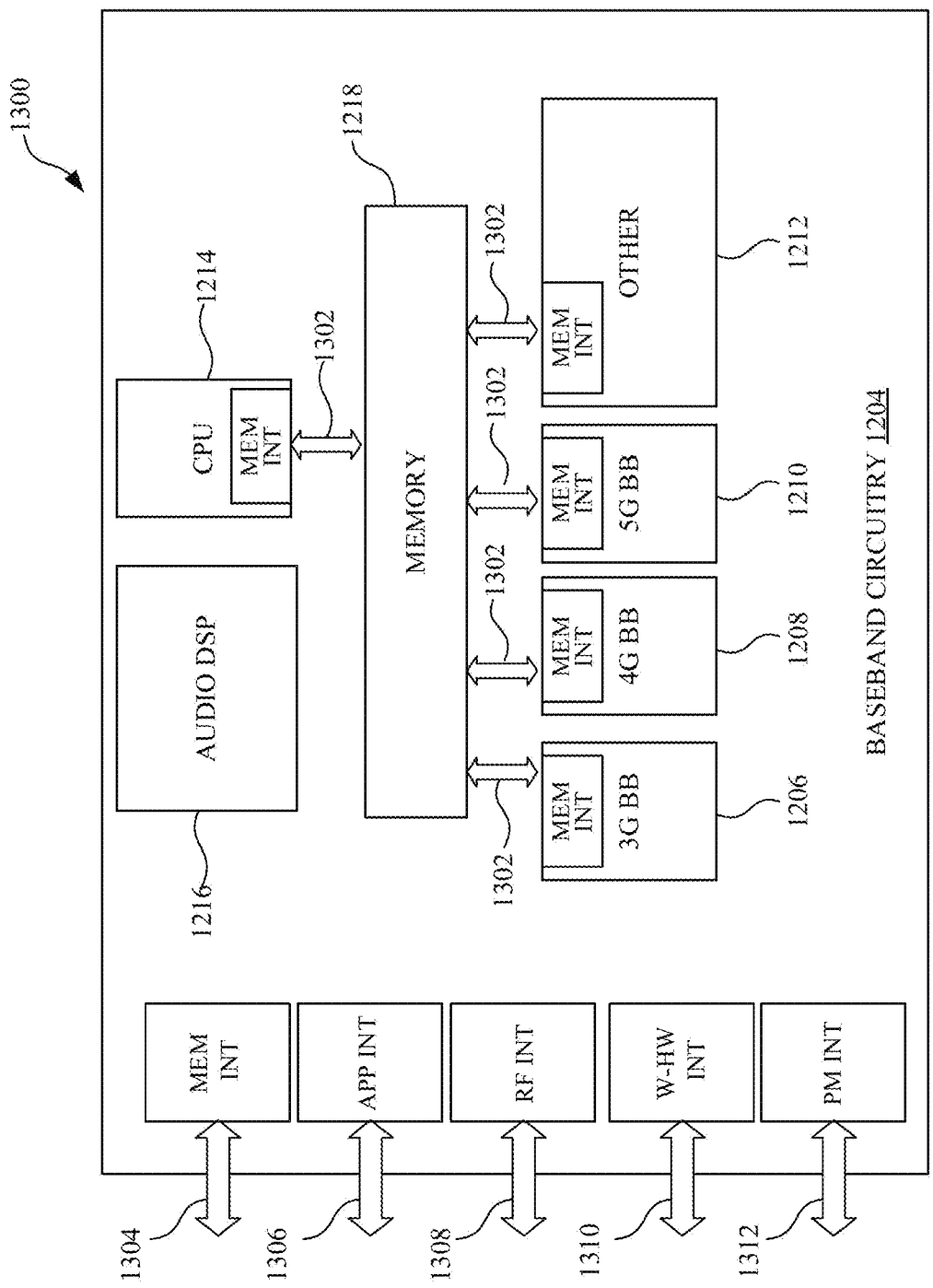
FIG. 13 illustrates example interfaces 1300 of baseband circuitry in accordance with some embodiments.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1318 utilized by said processors. As illustrated, each of the processors may include a respective memory interface 1302 to send/receive data to/from the memory 1318.

The baseband circuitry 1204 may further include one or more interfaces to communicatively couple to other circuitries/devices, such as a memory interface 1304 (e.g., an interface to send/receive data to/from memory external to the baseband circuitry 1304), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy), Wi-Fi® components, and other communication components), and a power management interface 1312 (e.g., an interface to send/receive power or control signals to/from the PMC 1234.

Figure 14:
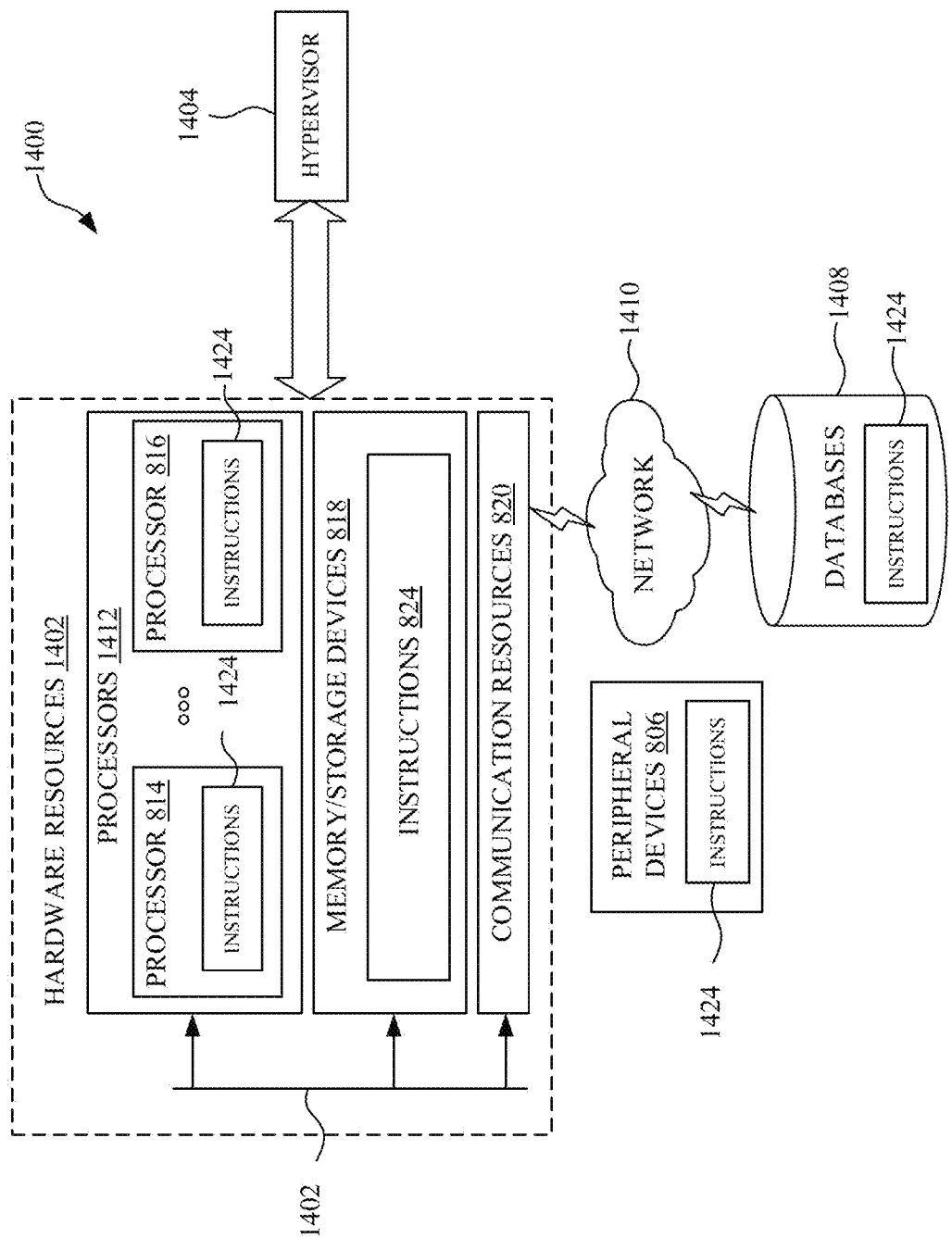
FIG. 14 illustrates components in accordance with some embodiments.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate m accordance with one or more of the examples set forth below in the example section.

Figure 15:
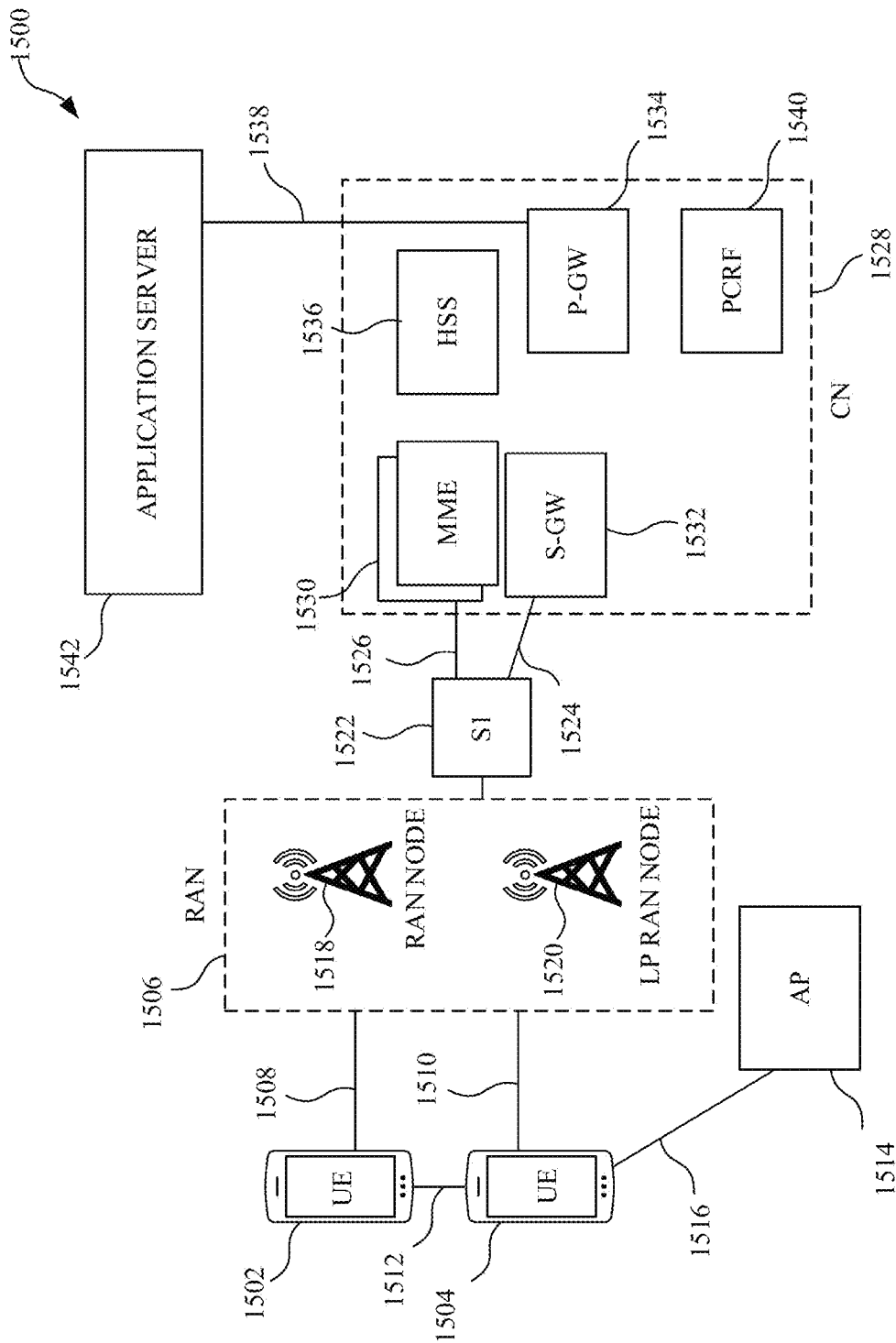
FIG. 15 illustrates an architecture of a wireless network in accordance with some embodiments.

FIG. 15 illustrates an architecture of a system 1500 of a network in accordance with some embodiments. The system 1500 includes one or more user equipment (UE), shown in this example as a UE 1502 and a UE 1504. The UE 1502 and the UE 1504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1502 and the UE 1104 can comprise an Internet of Things (IOT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the lol network.

The UE 1502 and the UE 1504 may be configured to connect, e.g., communicatively couple, with a radio access network (RAN), shown as RAN 1506. The RAN 1506 may be, for example, an Evolved ETniversal Mobile Telecommunications System (ETMTS) Terrestrial Radio Access Network (E-UTRAN), a NextGen RAN (NG RAN), or some other type of RAN. The UE 1502 and the UE 1504 utilize connection 1508 and connection 1510, respectively, each of which comprises a physical communications interface of layer (discussed in further detail below); in this example, the connection 1508 and the connection 1510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1502 and the UE 1504 may further directly exchange communication data via a ProSe interface 1512. The ProSe interface 1512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1504 is shown to be configured to access an access point (AP), shown as AP 1154, via connection 1516. The connection 1516 can comprise a local wireless connection, such as a connection consistent with any IEEE 802.15 protocol, wherein the AP 1514 would comprise a wireless fidelity (WiFi®) router. In this example, the AP 1514 may be connected to the Internet without connecting to the core network of the wireless system (described in further detail below).

The RAN 1506 can include one or more access nodes that enable the connection 1508 and the connection 1510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1506 may include one or more RAN nodes for providing macrocells, e.g., macro RAN node 1518, and one or more RAN nodes for providing femtocells or picocells (e.g., cells having smaller coverage areas, smaller user capacity, or higher bandwidth compared to macrocells), e.g., a low power (LP) RAN node such as LP RAN node 1520.

Any of the macro RAN node 1518 and the LP RAN node 1520 can terminate the air interface protocol and can be the first point of contact for the UE 1502 and the UE 1504. In some embodiments, any of the macro RAN node 1518 and the LP RAN node 1520 can fulfill various logical functions for the RAN 1506 including, but not limited to, radio network controller (RNC) functions such as radio bearer management, uplink and downlink dynamic radio resource management and data packet scheduling, and mobility management.

In accordance with some embodiments, the EGE 1502 and the EGE 1504 can be configured to communicate using Orthogonal Frequency-Division Multiplexing (OFDM) communication signals with each other or with any of the macro RAN node 1518 and the LP RAN node 1520 over a multicarrier communication channel in accordance various communication techniques, such as, but not limited to, an Orthogonal Frequency-Division Multiple Access (OFDMA) communication technique (e.g., for downlink communications) ox a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1518 and the LP RAN node 1520 to the UE 1502 and the UE 1504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1502 and the UE 1504. The physical downlink control channel (PDCCH) may carry information about the transport format and resource allocations related to the PDSCH channel, among other things. It may also inform the UE 1502 and the UE 1504 about the transport format, resource allocation, and H-ARQ (Hybrid Automatic Repeat Request) information related to the uplink shared channel. Typically, downlink scheduling (assigning control and shared channel resource blocks to the UE 1504 within a cell) may be performed at any of the macro RAN node 1518 and the LP RAN node 1520 based on channel quality information fed back from any of the UE 1502 and UE 1504. The downlink resource assignment information may be sent on the PDCCH used for (e.g., assigned to) each of the UE 1502 and the DE 1504.

The PDCCH may use control channel elements (CCEs) to convey the control information Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCD) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). As ECCE may have other numbers of EREGs in some situations.

The RAN 1506 is communicatively coupled to a core network (CN), shown as CN 1528—via an S1 interface 1522. In embodiments, the CN 1528 may be an evolved packet core (EPC) network, a NextGen Packet Core (NPC) network, or some other type of CN. In this embodiment the S1 interface 1522 is split into two parts: the S1-U interface 1524, which carries traffic data between the macro RAN node 1518 and the LP RAN node 1520 and a serving gateway (S-GW), shown as S-GW 1132, and an S1-mobility management entity (MME) interface, shown as S1-MME interface 1526, which is a signaling interface between the macro RAN node 1518 and LP RAN node 1520 and the MME(s) 1530. In this embodiment, the CN 1528 comprises the MME(s) 1530, the S-GW 1532, a Packet Data Network (PDN) Gateway (P-GW) (shown as P-GW 1534), and a home subscriber server (HSS) (shown as HSS 1536). The MME(s) 1530 may be similar in function to the control plane of legacy Serving General Packet Radio Service (GPRS) Support Nodes (SGSN). The MME(s) 1530 may manage mobility aspects in access such as gateway selection and tracking area list management. The HSS 1536 may comprise a database for network users, including subscription-related information to support the network entities' handling of communication sessions. The CN 1528 may comprise one or several HSS 1536, depending on the number of mobile subscribers, on the capacity of the equipment, on the organization of the network, etc. For example, the HSS 1536 can provide support for routing/roaming, authentication, authorization, naming/addressing resolution, location dependencies, etc.

The S-GW 1532 may terminate the S1 interface 322 towards the RAN 1506, and routes data packets between the RAN 1506 and the CN 1528. In addition, the S-GW 1532 may be a local mobility anchor point for inter-RAN node handovers and also may provide an anchor for inter-3 GPP mobility. Other responsibilities may include lawful intercept, charging, and some policy enforcement.

The P-GW 1534 may terminate an SGi interface toward a PDN. The P-GW 1534 may route data packets between the CN 1528 (e.g., an EPC network) and external networks such as a network including the application server 1542 (alternatively referred to as application function (AF)) via an Internet Protocol (IP) interface (shown as IP communications interface 1538). Generally, an application server 1542 may be an element offering applications that use IP bearer resources with the core network (e.g., ETMTS Packet Services (PS) domain, LTE PS data services, etc.). In this embodiment, the P-GW 1534 is shown to be communicatively coupled to an application server 1542 via an IP communications interface 1538. The application server 1542 can also be configured to support one or more communication services (e.g., Voice-over-Internet Protocol (VoIP) sessions, PTT sessions, group communication sessions, social networking services, etc.) for the UE 1502 and the UE 1504 via the CN 1528.

The P-GW 1534 may further be a node for policy enforcement and charging data collection. A Policy and Charging Enforcement Function (PCRF) (shown as PCRF 1540) is the policy and charging control element of the CN 1528. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1540 may be communicatively coupled to the application server 1542 via the P-GW 1534 The application server 1542 may signal the PCRF 1540 to indicate a new service flow and select the appropriate Quality of Service (QoS) and charging parameters. The PCRF 1540 may provision this rule into a Policy and Charging Enforcement Function (PCEF) (not shown) with the appropriate traffic flow template (TFT) and QoS class of identifier (QCI), which commences the QoS and charging as specified by the application server 1542.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments

Example 1 is a method by a user equipment (UE), comprising:

acquiring, from a Base Station (BS), one or more messages comprising a first group of parameters and a second group of parameters of one or more Configured Grant (CG) configurations in a bandwidth part (BWP) of a cell, wherein at least one CG configuration with the second group of parameters indicates a plurality of transmission occasions within a period; and repeating transmission of a Transport Block (TB) in the plurality of transmission occasions based on the at least one CG configuration.

Example 2 is the method of example 1, wherein the first group of parameters comprise a ConfiguredGrantConfig and wherein the second group of parameters comprise at least one parameter that is different from the ConfiguredGrantConfig.

Example 3 is the method of example 2, wherein the transmission of the TB is an initial transmission of TB or a retransmission of TB.

Example 4 is the method of example 3.

wherein the UE supports at least one Hybrid Automatic Repeated Request (HARQ) process and wherein the at least one CC configuration comprises both the first group of parameters and the second group of parameters.

Example 5 is the method of example 4, further comprising:

determining, an indication triggering an application of the at least one CG configuration, and wherein the transmission of the TB is the retransmission of the TB corresponding to the at least one HARQ process based on the second group of parameters in the at least one CG configuration.

Example 6 is the method of example 3, wherein the at least one CG configuration comprises a plurality of CG configurations, wherein a first CG configuration of the plurality of CG configurations comprises the first group of parameters, and wherein a second CG configuration of the plurality of CG configurations comprises the second group of parameters.

Example 7 is the method of example 6, wherein the first CG configuration and the second CG configuration indicate a same CG.

Example 8 is the method of example 7, further comprising:

determining, an indication triggering an application of the second CG configuration.

Example 9 is the method of example 8, wherein the period comprises survival time.

Example 10 is the method of example 9, wherein the transmission of the TB is the initial transmission of the TB based on the second group of parameters in the second CG configuration, and the initial transmission of the TB is repeated within the survival time.

Example 11 is the method of example 8, wherein the UE supports at least one Hybrid Automatic Repeated Request (HARQ) process, and wherein the transmission of the TB is the retransmission of the TB corresponding to the at least one HARQ process based on the second group of parameters in the second CG configuration.

Example 12 is the method of example 1, wherein the one or more messages comprise a Logical Channel Prioritization (LCP) signaling, and wherein a LogicalChannelConfig of the LCP signaling indicates at least two CG lists with LCP restrictions.

Example 13 is the method of example 12, wherein the at least two CG lists comprise a first CG list and a second CG list, wherein the first CG list comprises existing CG list in the LogicalChannelConfig.

wherein a part of CGs can be mapped to the existing CG list and another part of the CGs can be mapped to the second CG list, wherein the CG configuration associated with the CGs mapped to the second CG list comprises at least one parameter that is different from a parameter of the CG configuration associated with the CGs mapped to the existing CG list, wherein a first indication activates an application of the CGs mapped to the second CG list, and wherein a second indication deactivates the application of the COs mapped to the second CG list.

Example 14 is a method by a user equipment (UE), comprising:

acquiring, from a Base Station (BS), one or more messages comprising a first group of parameters and a second group of parameters of one or more Semi-Persistent Scheduling (SPS) configurations in a bandwidth part (BWP) of a cell, wherein at least one SPS configuration with the second group of parameters indicates a plurality of transmission occasions within a period; and repeating transmission of a Transport Block (TB) in the plurality of transmission occasions based on the at least one SPS configuration.

Example 15 is the method of example 14, wherein the first group of parameters comprise a SPS-Config and wherein the second group of parameters comprise at least one parameter that is different from the SPS-Config.

Example 16 is the method of example 15, wherein the at least one SPS configuration comprises both the first group of parameters and the second group of parameters.

Example 17 is the method of example 14.

wherein the at least one SPS configuration comprises a plurality of SPS configurations, wherein a first SP'S configuration of the plurality of SPS configurations comprises the first group of parameters, and wherein a second SP'S configuration of the plurality of SPS configurations comprises the second group of parameters.

Example 18 is a method by a Base Station (BS), comprising:

generating one or more messages for transmitting to user equipment (UE), wherein the one of more messages comprises a first group of parameters and a second group of parameters of one or more Configured Grant (CG) configuration in a bandwidth part (BWP) of a cell, wherein at least one CG configuration with the second group of parameters indicates a plurality of transmission occasions within a period, and receiving a repeated transmission of a Transport Block (TB) in the plurality of transmission occasions.

Example 19 is the method of example 18, wherein the first group of parameters comprise a ConfiguredGrantConfig and wherein the second group of parameters comprise at least one parameter that is different from the ConfiguredGrantConfig.

Example 20 is the method of example 19, wherein the repeated transmission of the TB is a repeated initial transmission of TB or a repeated retransmission of TB.

Example 21 is the method of example 20, wherein the UE supports at least one Hybrid Automatic Repeated Request (HARQ) process and wherein the at least one CG configuration comprises both the first group of parameters and the second group of parameters.

Example 22 is the method of example 21, further comprising:

transmitting, an indication triggering an application of the at least one CG configuration.

wherein the repeated transmission of TB is the repeated retransmission of TB corresponding to the at least one HARQ process based on the second group of parameters in the at least one CG configuration.

Example 23 is the method of example 20, wherein the at least one CG configuration comprise a plurality of CG configurations, wherein a first CG configuration of the plurality of CG configurations comprises the first group of parameters, and wherein a second CG configuration of the plurality of CG configurations comprises the second group of parameters.

Example 24 is the method of example 23, wherein the first CG configuration and the second CG configuration indicate a same CG.

Example 25 is the method of example 24, further comprising:

transmitting, an indication triggering an application of the second CG configuration.

Example 26 is the method of example 25, wherein the period comprises survival time.

Example 27 is the method of example 26, wherein the repeated transmission of the TB is, within the survival time, a repeated initial transmission of TB or a repeated retransmission of TB.

Example 28 is the method of example 25, wherein the UE supports at least one Hybrid Automatic Repeated Request (HARQ) process and the method further comprising; and wherein the repeated transmission of TB is the repeated retransmission of TB corresponding to the at least one HARQ process based on the second group of parameters in the second CG configuration.

Example 29 is the method of example 18, wherein the one or more message comprise a Logical Channel Prioritization (LCP) signaling, and wherein a LogicalChannelConfig of the LCP signaling indicates at least two CG lists with LCP restrictions.

Example 30 is the method of example 29, wherein the at least two CG lists comprise a first CG list and a second CG list,
wherein the first CG list comprises existing CG list in the LogicalChannelConfig,
wherein a part of CGs can be mapped to the existing CG list and another part of the CGs can be mapped to the second CG list,
wherein the CG configuration associated with the CGs mapped to the second CG list comprises at least one parameter that is different from a parameter of the CG configuration associated with the CGs mapped to the existing CG list,
wherein a first indication activates an application of the CGs mapped to the second CG list, and
wherein a second indication deactivates the application of the CGs mapped to the second CG list.

Example 31 is a method by a Base Station (BS), comprising:
generating one or more messages for transmitting to user equipment (UE), wherein the one of more messages comprises a first group of parameters and a second group of parameters of one or more Semi-Persistent Scheduling (SPS) configuration in a bandwidth part (BWP) of a cell, wherein at least one SPS configuration with the second group of parameters indicates a plurality of transmission occasions within a period, and
receiving a repeated transmission of a Transport Block (TB) in the plurality of transmission occasions Example 32 is the method of example 31, wherein the first group of parameters comprise a SPS-Config and wherein the second group of parameters comprise at least one parameter that is different from the SPS-Config.

Example 33 is the method of example 32, wherein the at least one SPS configuration comprise both the first group of parameters and the second group of parameters.

Example 34 is the method of example 31,
wherein the at least one SPS comprise a plurality of SPS configurations,
wherein a first SPS configuration of the plurality of SPS configurations comprises the first group of parameters, and
wherein a second SPS configuration of the plurality of SPS configurations comprises the second group of parameters.

Example 35 is an apparatus for a user equipment (UE), the apparatus comprising:
one or more processors configured to perform steps of the method according to any of examples 1-17.

Example 36 is an apparatus for a base station, the apparatus comprising:
one or more processors configured to perform steps of the method according to any of examples 17-34.

Example 37 is a computer readable medium having computer programs stored thereon which, when executed by one or more processors, cause an apparatus to perform steps of the method according to any of examples 1-34.

Example 38 is an apparatus for a communication device, comprising means for performing steps of the method according to any of examples 1-34.

Example 39 is a computer program product comprising computer programs which, when executed by one or more processors, cause an apparatus to perform steps of the method according to any of examples 1-34.

Any of the above described examples may be combined with any other example for combination of examples), unless explicitly stated otherwise The foregoing description of one ox more implementations provides illustration and description, but is not intended to be exhaustive or to limit the scope of embodiments to the precise form disclosed. Modifications and variations are possible in light of the above teachings of may be acquired from practice of various embodiments It should be recognized that the systems described herein include descriptions of specific embodiments. These embodiments can be combined into single systems, partially combined into other systems, split into multiple systems or divided ox combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry of governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method by a user equipment (UE), comprising:
acquiring, from a Base Station (BS), one or more messages comprising a first group of parameters and a second group of parameters of one or more Configured Grant (CG) configurations in a bandwidth part (BWP) of a cell, wherein at least one CG configuration with the second group of parameters indicates a plurality of transmission occasions within a period; and
repeating transmission of a Transport Block (TB) in the plurality of transmission occasions based on the at least one CG configuration.

2. The method of claim 1, wherein the first group of parameters comprise a ConfiguredGrantConfig and wherein the second group of parameters comprise at least one parameter that is different from the ConfiguredGrantConfig.

3. The method of claim 2, wherein the transmission of the TB is an initial transmission of TB or a retransmission of TB.

4. The method of claim 3,
wherein the UE supports at least one Hybrid Automatic Repeated Request (HARQ) process and
wherein the at least one CG configuration comprises both the first group of parameters and the second group of parameters.

5. The method of claim 4, further comprising:
determining, an indication triggering an application of the at least one CG configuration, and wherein the transmission of the TB is the retransmission of the TB corresponding to the at least one HARQ process based on the second group of parameters in the at least one CG configuration.

6. The method of claim 3,
wherein the at least one CG configuration comprises a plurality of CG configurations,
wherein a first CG configuration of the plurality of CG configurations comprises the first group of parameters, and
wherein a second CG configuration of the plurality of CG configurations comprises the second group of parameters.

7. The method of claim 6, wherein the first CG configuration and the second CG configuration indicate a same CG.

8. The method of claim 7, further comprising:
determining, an indication triggering an application of the second CG configuration.

9. The method of claim 8, wherein the period comprises survival time.

10. The method of claim 9,
wherein the transmission of the TB is the initial transmission of the TB based on the second group of parameters in the second CG configuration, and the initial transmission of the TB is repeated within the survival time.

11. The method of claim 8, wherein the UE supports at least one Hybrid Automatic Repeated Request (HARQ) process, and
wherein the transmission of the TB is the retransmission of the TB corresponding to the at least one HARQ process based on the second group of parameters in the second CG configuration.

12. The method of claim 1, wherein the one or more messages comprise a Logical Channel Prioritization (LCP) signaling, and wherein a LogicalChannelConfig of the LCP signaling indicates at least two CG lists with LCP restrictions.

13. The method of claim 12, wherein the at least two CG lists comprise a first CG list and a second CG list,
wherein the first CG list comprises existing CG list in the LogicalChannelConfig,
wherein a part of CGs can be mapped to the existing CG list and another part of the CGs can be mapped to the second CG list,
wherein the CG configuration associated with the CGs mapped to the second CG list comprises at least one parameter that is different from a parameter of the CG configuration associated with the CGs mapped to the existing CG list,
wherein a first indication activates an application of the CGs mapped to the second CG list, and
wherein a second indication deactivates the application of the CGs mapped to the second CG list.

14. A method by a user equipment (UE), comprising:
acquiring, from a Base Station (BS), one or more messages comprising a first group of parameters and a second group of parameters of one or more Semi-Persistent Scheduling (SPS) configurations in a bandwidth part (BWP) of a cell, wherein at least one SPS configuration with the second group of parameters indicates a plurality of transmission occasions within a period; and
repeating transmission of a Transport Block (TB) in the plurality of transmission occasions based on the at least one SPS configuration.

15. The method of claim 14, wherein the first group of parameters comprise a SPS-Config and wherein the second group of parameters comprise at least one parameter that is different from the SPS-Config.

16. The method of claim 15, wherein the at least one SPS configuration comprises both the first group of parameters and the second group of parameters.

17. The method of claim 14,
wherein the at least one SPS configuration comprises a plurality of SPS configurations,
wherein a first SPS configuration of the plurality of SPS configurations comprises the first group of parameters, and
wherein a second SPS configuration of the plurality of SPS configurations comprises the second group of parameters.

18. A method by a Base Station (BS), comprising:
generating one or more messages for transmitting to user equipment (UE), wherein the one or more messages comprises a first group of parameters and a second group of parameters of one or more Configured Grant (CG) configuration in a bandwidth part (BWP) of a cell, wherein at least one CG configuration with the second group of parameters indicates a plurality of transmission occasions within a period, and
receiving a repeated transmission of a Transport Block (TB) in the plurality of transmission occasions.

19. The method of claim 18, wherein the first group of parameters comprise a ConfiguredGrantConfig and wherein the second group of parameters comprise at least one parameter that is different from the ConfiguredGrantConfig.

20. The method of claim 19, wherein the repeated transmission of the TB is a repeated initial transmission of TB or a repeated retransmission of TB.

\* \* \* \* \*